US012142722B2

(12) United States Patent
Wang et al.

(10) Patent No.: US 12,142,722 B2
(45) Date of Patent: Nov. 12, 2024

(54) RECHARGEABLE Li-ION BATTERY WITH HALOGEN INTERCALATED GRAPHITE ELECTRODE

(71) Applicant: University of Maryland, College Park, College Park, MD (US)

(72) Inventors: Chunsheng Wang, Silver Spring, MD (US); Chongyin Yang, College Park, MD (US); Jijian Xu, Hyattsville, MD (US)

(73) Assignee: University of Maryland, College Park, College Park, MD (US)

(*) Notice: Subject to any disclaimer, the term of this patent is extended or adjusted under 35 U.S.C. 154(b) by 486 days.

(21) Appl. No.: 17/436,609

(22) PCT Filed: Mar. 6, 2020

(86) PCT No.: PCT/US2020/021527
§ 371 (c)(1),
(2) Date: Sep. 5, 2021

(87) PCT Pub. No.: WO2020/181244
PCT Pub. Date: Sep. 10, 2020

(65) Prior Publication Data
US 2022/0131180 A1    Apr. 28, 2022

Related U.S. Application Data

(60) Provisional application No. 62/814,618, filed on Mar. 6, 2019.

(51) Int. Cl.
H01M 10/0525    (2010.01)
H01M 4/04    (2006.01)
(Continued)

(52) U.S. Cl.
CPC ....... H01M 10/0525 (2013.01); H01M 4/043 (2013.01); H01M 4/133 (2013.01);
(Continued)

(58) Field of Classification Search
CPC ......... H01M 2300/0002; H01M 4/133; H01M 4/1393; H01M 4/583; H01M 4/5835;
(Continued)

(56) References Cited

U.S. PATENT DOCUMENTS 4,009,323 A    2/1977 Bennion et al.
2015/0037680 A1    2/2015 Park et al.
(Continued)

FOREIGN PATENT DOCUMENTS

KR    20160015708    * 2/2016

OTHER PUBLICATIONS

KR20160015708 English translation. Uhm et al. Korea. Feb. 15, 2016. (Year: 2016).*
Yang et al., "4.0 V Aqueous Li-ion Batteries," Joule, 1.1 (2017), 122-132.
Lin et al., "An Ultrafast Rechargeable Aluminium-ion Battery," Nature 520.7547 (2015), 324-328.
(Continued)

Primary Examiner — Christopher P Domone
(74) Attorney, Agent, or Firm — Don D. Cha; HDC Intellectual Property Law, LLP

(57) ABSTRACT

The disclosure provides rechargeable lithium ion batteries comprising at least one lithium salt-graphite composite electrode. In particular, the disclosure provides a rechargeable "water-in-bisalt" lithium ion battery with a high potential where at least a portion of the lithium salt is phase separated from the aqueous electrolyte, and where the anionic-redox reaction occurs within the graphitic lattice.

20 Claims, 11 Drawing Sheets

(51) Int. Cl.
  *H01M 4/133* (2010.01)
  *H01M 4/1393* (2010.01)
  *H01M 4/36* (2006.01)
  *H01M 4/60* (2006.01)
  *H01M 4/62* (2006.01)
  *H01M 10/0568* (2010.01)

(52) U.S. Cl.
  CPC ......... *H01M 4/1393* (2013.01); *H01M 4/364* (2013.01); *H01M 4/604* (2013.01); *H01M 4/623* (2013.01); *H01M 10/0568* (2013.01); *H01M 2300/0085* (2013.01)

(58) Field of Classification Search
  CPC ................. H01M 4/587; H01M 4/623; H01M 2300/0085; H01M 4/043; H01M 4/364
  See application file for complete search history.

(56) References Cited

U.S. PATENT DOCUMENTS

2018/0219214 A1  8/2018  Zhamu et al.
2018/0294475 A1* 10/2018  Zhamu ................. H01M 4/624
2020/0251779 A1* 8/2020  Xu ....................... H01M 4/5825

OTHER PUBLICATIONS

PCT International Search Report for PCT Patent Application No. PCT/US2020/021527, dated Jun. 23, 2020.
First Examination Report for Indian Patent Application No. 202127040301, dated Feb. 15, 2023.
An Office Action dated Dec. 15, 2023, of the corresponding Chinese Patent Application No. 202080018985.4.
An Office Action dated Jan. 25, 2024, of the corresponding Japanese Patent Application No. JP2021-552631.
A Second Office Action dated Jul. 2, 2024, of the corresponding Chinese Patent Application No. 202080018985.4.

* cited by examiner

RECHARGEABLE Li-ION BATTERY WITH HALOGEN INTERCALATED GRAPHITE ELECTRODE

CROSS-REFERENCE TO RELATED APPLICATIONS

This application is a U.S. National Stage Patent Application under 35 U.S.C. § 371 of PCT Patent Application No. PCT/US20/21527, filed Mar. 6, 2020, which claims the priority benefit of U.S. Provisional Application No. 62/814,618, filed Mar. 6, 2019, all of which are incorporated herein by reference in their entirety.

STATEMENT REGARDING FEDERALLY FUNDED RESEARCH

This invention was made with government support under DE-AR0000389 awarded by Department of Energy, Advanced Research Projects Agency-Energy. The government has certain rights in the invention.

FIELD

The present invention relates to rechargeable lithium ion batteries comprising a lithium salt-graphite composite electrode. In particular, the present invention relates to a rechargeable "water-in-salt" lithium ion battery with a high potential where at least a portion of the lithium salt is phase separated from the aqueous electrolyte.

BACKGROUND

Lithium ion batteries are a useful and powerful energy storage option. Their use has been expanding to a variety of products including, but not limited to, portable electronics (e.g., computers, mobile phones, speakers, etc.) to hybrid and electric cars. Lithium ion batteries are low maintenance and display higher charge storage densities and voltages and out-perform typical lead-acid batteries, as the small lithium-ions can pack densely into the anode material.

Recent breakthroughs in aqueous electrolytes via "water-in-salt" approach significantly expanded lithium ion battery's electrochemical potential to 3.0 to 4.0 V range, and made it possible to couple high voltage cathodes with low-potential graphite anode. However, the limited gravimetric capacity (<200 mAh/g) of intercalation cathodes based on lithium transition metal oxides constitute fundamental hurdle to access higher energy densities.

Intercalation cathode chemistries used in state-of-the-art Li-ion batteries (LIB) store electrical energy by accommodating $Li^+$ in their lattices with charge compensation from cationic redox reactions of transition metals (Ni, Co, Mn, Fe, etc.), which occurs with superior reversibility (long cycle life) but delivers mediocre capacities (<200 mAh $g^{-1}$) due to their heavy molar mass per intercalated $Li^+$ and potential structural instability upon over-delithiation. The anionic redox reactions ($O/O^{2-}$, $S/S^{2-}$, etc.), on the other hand, promise much higher capacities by following a conversion reaction mechanism, but normally proceed with extremely poor reversibility, which arises from the repeated breaking and re-formation of structures and the accompanied large volume change upon each charge/discharge cycle. The low electronic and ionic conductivities of these anionic redox materials further worsen the issue.

The combination of both cationic and anionic redox mechanisms in an intercalation host has been recently discovered in Li-excess transition metal oxide materials, where the oxygen layer participates the cell reaction and significantly contributed to the overall capacity of transition metal oxides. Lithium batteries based on anionic-redox reaction that occurs in an intercalation host would be highly attractive, as it would inherit both the high energy of anionic-redox conversion-reaction and the excellent reversibility from topotactic mechanism of intercalation. $PF_6^-$, $BF_4^-$, $TFSI^-$ anions in electrolyte of 'dual-ion' batteries can be reversibly intercalated into graphite. However, these redox reactions only occur on graphite lattice rather than anion themselves, limiting the capacity below 120 mAh $g^{-1}$. Redox of $S/S_n^{2-}$ and $Br^-/Br_3^-$ catholytes in porous carbon are highly reversible, but these anions were only physically confined in/adsorb on the porous carbon, resulting in high self-discharge and low cycle life due to undesired shuttling reaction. Ideally, to avoid the shuttle reaction, the anion-catholytes should phase-separate from electrolytes, while oxidized anions should be stabilized via intercalation in a solid host. Thus far, however, no suitable anions, intercalation host and electrolytes have been identified to support this ideal energy storage mechanism with sufficient capacity at a high potential.

Therefore, there is a need for a suitable intercalation host and electrolytes that provide a higher capacity and/or a high potential.

SUMMARY

Some aspects of the invention utilize a halogen conversion-intercalation chemistry in graphite to provide a rechargeable high potential and/or high capacity lithium battery. In one particular aspect of the invention, a rechargeable lithium-ion battery (i.e., lithium battery) is provided. The lithium battery comprises: (i) a composite cathode comprising a lithium salt and graphite; (ii) an electrolyte; and (iii) an anode. In one particular embodiment, the composite cathode is configured such that the oxidation product of the lithium salt is or becomes intercalated in said graphite. Still in other embodiments, the lithium-ion battery has a capacity of greater than 200 mAh/g, typically at least about 230 mAh/g, often at least about 240 mAh/g, and most often at least about 250 mAh/g. Yet in other embodiments, an energy density of said lithium-ion battery is at least about 400 Wh/kg, typically at least about 430 Wh/kg, often at least about 460 Wh/kg, and most often at least about 500 Wh/kg. When referring to a numerical value, the term "about" or "approximately" are used interchangeably herein and refer to being within an acceptable error range for the particular value as determined by one of ordinary skill in the art. Such a value determination will depend at least in part on how the value is measured or determined, e.g., the limitations of the measurement system, i.e., the degree of precision required for a particular purpose. For example, the term "about" can mean within 1 or more than 1 standard deviation, per the practice in the art. Alternatively, the term "about" when referring to a numerical value can mean±20%, typically ±10%, often ±5% and more often ±1% of the numerical value. In general, however, where particular values are described in the application and claims, unless otherwise stated, the term "about" means within an acceptable error range for the particular value, typically within one standard deviation.

In other embodiments, the coulombic efficiency of said lithium battery is at least about 95%, typically at least about 98%, often at least about 99%, and most often at least about 99.9%.

Still in other embodiments, said lithium-ion battery has a potential of at least about 4 V vs. Li/Li$^+$, typically at least about 4.1 V, often at least about 4.15 V, and most often at least about 4.2 V.

In some embodiments, the composite cathode comprises a plurality of lithium salts, such as lithium halide salts. Still in other embodiments, the composite cathode comprises lithium chloride, lithium bromide, lithium iodide, lithium fluoride, and other halogen salts or a combination thereof. In one particular embodiment, the composite cathode comprises a combination of lithium chloride and lithium bromide.

In one particular embodiment, the electrolyte comprises a fluoride-based electrolyte. Exemplary fluoride-based electrolytes that can be used in lithium batteries of the invention include, but are not limited to, lithium bis(trifluoromethanesulfonyl)imide (LiTFSI), lithium trifluoromethanesulfonate (LiOTf), lithium bis(fluorosulfonyl)imide (LiFSI), lithium hexafluorophosphate (LiPF$_6$), lithium tetrafluoroborate (LiBF$_4$), lithium difluoro(oxalato)borate (LiDFOB), lithium hexafluoroarsenate (LiAsF$_6$), Lithium perchlorate (LiClO$_4$), Lithium nitrate (LiNO$_3$) or electrolytes that can be phase-separated with lithium halogen salt electrolyte and a mixture thereof.

In another embodiment, said electrolyte comprises water-in-bisalt electrolyte (WiBS), a highly concentrated organic electrolyte, an all-solid-state ceramic electrolyte, an electrolyte that can phase separate with lithium halogen salt electrolyte, or a combination thereof.

Exemplary highly concentrated organic electrolytes include, but are not limited to, 2 m lithium bis(trifluoromethanesulfonyl)imide (LiTFSI)+2 lithium difluoro(oxalato)borate (LiDFOB) in dimethoxyethane, 4 m lithium tetrafluoroborate (LiBF$_4$) in ethylene carbonate (EC), 7 m lithium bis(fluorosulfonyl)imide (LiFSI) in fluoroethylene carbonate (FEC), and 2 m lithium tetrafluoroborate (LiBF$_4$) in mixed ethylene carbonate (EC) and propylene carbonate (PC) with volume ratio of 1:1.

Exemplary all-solid-state ceramic electrolytes include, but are not limited to, Li$_4$(BH$_4$)$_3$I, Li$_4$(BH$_4$)$_3$Br, Li$_4$(BH$_4$)$_3$Cl, LiBH$_4$—LiBr—LiCl solid solution, Li$_2$Al$_2$SiP$_2$TiO$_{13}$ (LASPT), Li$_7$La$_3$Zr$_2$O$_{12}$ (LLZO), and PEO-LiTFSI polymer electrolyte.

Still in other embodiments, said electrolyte is in a form of an aqueous gel. Yet in other embodiments, said electrolyte further comprises poly(ethylene oxide), polyvinyl alcohol, polyacrylonitrile, poly(methyl methacrylate), polyacrylic acid, polytetrahydrofuran, polyethylene glycol dimethacrylate, poly(ethylene glycol) diacrylate, 2-hydroxyethyl acrylate, poly(ethylene glycol) methyl ether, bisphenol A ethoxylate dimethacrylate, polyvinylpyrrolidone and other hydrophilic polymers, or a combination thereof.

Another aspect of the invention provides a method for producing a lithium salt-graphite composite cathode for use in a rechargeable lithium ion battery. In some embodiments, the lithium salt is intercalated in said graphite. The method includes compressing a mixture of a lithium salt-graphite composite material and a polymer under conditions sufficient to produce a lithium salt graphite composite cathode, whereby an oxidation of the lithium salt results in intercalation of an oxidation product of the lithium salt within the graphite.

In some embodiments, the method further comprises the steps of admixing a lithium salt and graphite and milling said mixture to produce said lithium salt-graphite composite material prior to admixing with said polymer. In one particular embodiment, the lithium salt comprises two or more lithium salts, typically lithium halide salts.

In one specific embodiment, the lithium salt is a mixture of lithium bromide and lithium chloride. The molar ratio of lithium bromide to lithium chloride is about 5:1, typically about 3:1, often about 2:1, and most often about 1:1.

Still in other embodiments, the mass ratio of said lithium bromide, said lithium chloride, and said graphite is about 2:0.25:2, typically about 2:0.5:2, and often about 2:1:2.

Yet in other embodiments, said polymer comprises poly (vinylidenedifluoride) (PTFE), polyvinylidene difluoride (PVDF), polyvinylpyrrolidone (PVP), styrene-butadiene rubber (SBR), carboxymethyl cellulose (CMC), alginic acid, 1,1,2,2-tetrafluoroethyl-2,2,2-trifluoroethyl ether, 1,1,2,2-tetrafluoroethyl-2,2,3,3-tetrafluoropropyl ether, bis(2,2,2-trifluoroethyl) ether, or a mixture thereof. In one particular embodiment, said polymer comprises PTFE.

In other embodiments, the mass ratio of said lithium salt-graphite composite material to said polymer is about 90:10, typically about 92:8, often about 94:6, and most often about 95:5.

Yet another aspect of the invention provides a rechargeable lithium-ion battery comprising: (i) a composite cathode comprising at least one lithium salt and graphite, wherein the composite cathode is configured such that an oxidation of the lithium salt results in intercalation of an oxidation product of the lithium salt within the graphite; (ii) an aqueous electrolyte; and (iii) an anode comprising a fluorinated polymer.

In some embodiments, said aqueous electrolyte comprises water-in-bisalt electrolyte (WiBS). In one particular embodiment, said WiBS comprises lithium bis(trifluoromethanesulfonyl)imide (LiTFSI), lithium trifluoromethanesulfonate (LiOTf), lithium bis(fluorosulfonyl)imide (LiFSI), lithium hexafluorophosphate (LiPF$_6$), Lithium tetrafluoroborate (LiBF$_4$), Lithium difluoro(oxalato)borate (LiDFOB), Lithium hexafluoroarsenate (LiAsF$_6$), asymmetric ammonium salt (Me3EtN·TFSI), N-propyl-N-methylpyrrolidinium bis(trifluoromethanesulfonyl)imide (pyr13TFSI), other ionic liquid, or a mixture thereof.

In other embodiments, WiBS may also include organic solvent. Suitable organic solvents include, but are not limited to, trimethyl phosphate, ethylene carbonate (EC), dimethyl carbonate (DMC), diethyl carbonate (DEC), propylene carbonate (PC), γ-butyrolactone (γ-BL), ethyl methyl carbonate, dimethoxyethane, diglycol methyl ether, fluoroethylene carbonate (FEC) and derivatives thereof, as well as other organic solvents that are known to one skilled in the art or used in lithium-ion batteries. See, for example, Long et al., in "Polymer electrolytes for lithium polymer batteries," *J. Mater. Chem. A*, 2016, 4, pp. 10038-10069, which is incorporated herein by reference in its entirety. When organic solvent is present, the amount of organic solvent used relative to water is about 66% or less (i.e., 2 or less:1) by volume, typically about 50% or less (i.e., 1 or less:1) by volume, and often about 20% or less (i.e., 1 or less:4) by volume.

Yet in other embodiments, at least a portion of said lithium salt is phase-separated from said aqueous electrolyte.

In other embodiments, the anode is protected by said fluorinated polymer. In some embodiments, said fluorinated polymer is a fluorinated ether polymer. In other embodiments, said fluorinated polymer comprises a highly fluorinated ether (HFE) polymer gel (such as 1,1,2,2-tetrafluoroethyl-2,2,2-trifluoroethyl ether, 1,1,2,2-tetrafluoroethyl-2,2,3,3-tetrafluoropropyl ether, bis(2,2,2-trifluoroethyl) ether, or a mixture thereof.

DETAILED DESCRIPTION

Figure 1:
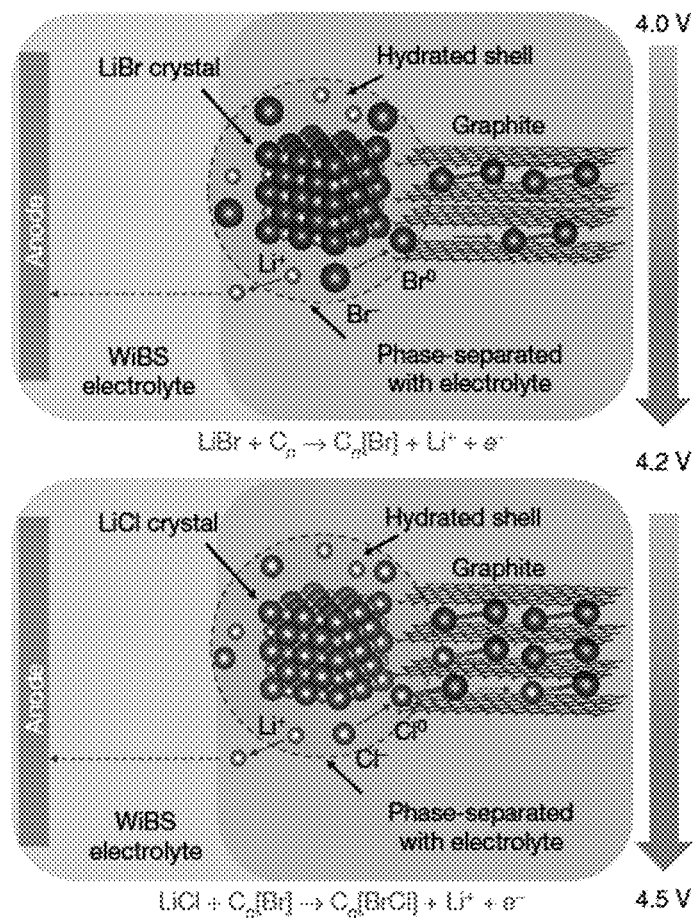
FIG. 1 is a schematic illustration of the conversion-intercalation mechanism occurring in LBC-G composite during its oxidation in WiBS aqueous-gel electrolyte. The two-stage reactions involved the oxidation of $Br^-$ (~4.0 V) and $Cl^-$ (~4.2 V) and their subsequent intercalation into graphitic structure. The discharge was a complete reversal of the charge process.

Some aspects of the invention provide lithium batteries with a capacity of at least about 200 mAh/g, typically at least about 210 mAh/g, often at least about 220 mAh/g, more often at least about 230 mAh/g, and most often at least about 240 mAh/g (of total weight of composite electrode). In other aspects of the invention provide lithium batteries having an average potential of at least about 4.0 V, typically at least about 4.1 V, and often at least about 4.2 V (versus Li/Li+).

Such a high capacity and/or high potential lithium battery is possible due to the discovery by the present inventors of a new electrode that intercalates a lithium salt within the graphite. Without being bound by any theory, it is believed that in lithium batteries of the invention the anionic-redox reaction occurs within the graphite lattice and the oxidized anions are stabilized by intercalation into graphite lattice, thereby avoiding the problems associated with conventional batteries utilizing intercalation cathode chemistry.

Conventional intercalation cathode chemistries used in Li-ion batteries (LIB) store electrical energy by accommodating $Li^+$ in their lattices with charge compensation from cationic redox reactions of transition metals (e.g., Ni, Co, Mn, Fe, etc.), which occurs with superior reversibility (long cycle life) but delivers a relatively low capacities due to their heavy molar mass per intercalated $Li^+$ and potential structural instability upon over-delithiation. Furthermore, it is believed that by providing an environment where the anionic-redox reaction of the battery occurs in an intercalation host results in both the high energy of anionic-redox conversion-reaction and the excellent reversibility from topotactic mechanism of intercalation.

For the sake of brevity and clarity, the invention will now be described in reference to using a composite electrode comprising graphite with lithium halide salts, in particular a combination of lithium bromide and lithium chloride. However, it should be appreciated that the scope of the invention is not limited to, lithium salt-graphite composite electrode. In general, any combination of an electrode material and an anionic salt that provides anionic-redox reaction to occur within the crystal lattice of the electrode material and stabilization of the oxidized anions within the crystal lattice of the electrode material can be used in the present invention.

In some embodiments, lithium-ion batteries of the invention include a water-in-bisalt (WiBS) electrolyte. It is believed that the WiBS electrolyte enables or enhances a conversion-intercalation reaction. As used herein, unless explicitly stated or the context requires otherwise, the conversion reaction refers to anionic oxidation reaction, for example, conversion of bromide ion to bromine gas or conversion of chloride ion to chlorine gas, or conversion of a mixture of bromide and chloride ions to bromine gas, chlorine gas, and/or Br—Cl gas.

Some aspects of the invention are based on the anionic-redox reaction of halide anions ($Br^-$ and $Cl^-$). In particular, it is believed that both the anionic-redox reaction of halide anions and the resulting oxidation products remain intercalated or entrapped within the electrode, e.g., graphite, lattice. In one particular embodiment of the invention, a composite electrode containing graphite with equimolar lithium halide salts (($LiBr)_{0.5}(LiCl)_{0.5}$-graphite, hereafter denoted as LBC-G) was prepared as active material. In some embodiments, WiBS electrolyte is used in lithium batteries of the invention. It is believed that the highly concentrated WiBS electrolyte confines at least a portion of the hydrated LiBr and LiCl inside the solid cathode matrix. The anionic-redox reaction, i.e., oxidation of bromide and chloride anions, to the oxidized products, e.g., $Br^0$ and $Cl^0$, is believed to occur within the graphite lattice and the oxidized products are stabilized by their intercalation into graphitic structure.

Other aspects of the invention provide lithium-ion batteries that utilize high density halide ion packing and a water-in-salt electrolyte to achieve a potential of over 4 volts in aqueous batteries. It is believed that lithium salts within the graphite lattice are phase-separated from aqueous electrolytes. Accordingly, other aspects of the invention provide a rechargeable lithium-ion battery having at least a portion of lithium salt that is phase-separated from an aqueous electrolyte. By having at least a portion of the lithium salts phase-separated from the aqueous electrolyte, diffusion or shuttling of halide anions and oxidation product of halide anions is avoided, thereby significantly increasing the life cycle of the battery. The term "life cycle" when referring to a battery is defined as a total number of recharging while still maintaining coulombic efficiency of at least 99%, typically at least 99.5%, and often at least 99.9%. Alternatively, the term "life cycle" refers to the number of total cycle that the battery can be recharged before having its capacity drop or fall below about 80%, typically about 85%, and often about 90% of its theoretical capacity. The term "cycle" when referring to a battery means a recharging of the battery, typically recharging from about 5% or less charge to at least about 90% charge. Thus, one skilled in the art can readily determine the "life cycle" of a battery by allowing the battery's charge to deplete to about 5% or less of the theoretical charge and recharging the battery to at least about 90% of the theoretical charge, and repeating the process until either the coulombic efficiency or the capacity of the battery falls below the amount as defined herein.

Yet in some embodiments, the lithium batteries of the invention have capacity retention of at least about 70%, typically at least about 75%, often at least about 80%, more often at least about 85%, and most often at least about 90% after 100 cycles.

Still yet in other embodiments, the lithium battery of the invention has capacity retention of at least about 80%, typically at least about 85%, often at least about 90%, and more often at least about 95% after 100 cycles.

In other embodiments, the lithium battery of the invention has coulombic efficiency of at least about 80%, typically at least about 85%, often at least about 90%, more often at least 95%, and most often at least about 98% throughout its life cycle. Still in other embodiments, the lithium battery of the invention has coulombic efficiency of at least 99%, typically at least 99.5%, and often at least 99.9% throughout its life cycle.

In further embodiments, the lithium battery of the invention has energy density of at least about 250 Wh $kg^{-1}$, typically at least about 300 Wh $kg^{-1}$, often at least about 350 Wh $kg^{-1}$, more often at least about 400 Wh $kg^{-1}$, and most often at least about 450 Wh $kg^{-1}$. It should be appreciated that the scope of the invention is not limited to these particular energy densities. In fact, the energy density of a particular battery of the invention depends on a variety of factors such as, but not limited to, the lithium salt(s), the anode material, the aqueous electrolyte, etc.

For LiBr and LiCl, the theoretical energy capacity was calculated to be 309 mAh $g^{-1}$ and 632 mAh $g^{-1}$, respectively, at a high delithiation/lithiation potentials of 4.0-4.5 V vs. $Li/Li^+$. These values for the theoretical energy capacity and the potential are significantly higher than those of other anions, e.g., sulfur at ~2.2 V or oxygen at ~3.0 V. The reversible redox reaction of these halide anions followed by their intercalation into graphite creates a densely-loaded stage I intercalation compound $C_{3.5}[Br_{0.5}Cl_{0.5}]$, corresponding to an overall capacity of 243 mAh $g^{-1}$ (based on total mass of LBC-G cathode). By coupling LBC-G cathode with a protected graphite anode disclosed by the present inventors (see Yang, C. et al. 4.0 V Aqueous Li-Ion Batteries. *Joule*

2017, 1, 122-132), a 4.0 V class aqueous full cell was created, delivering an energy density (460 Wh kg$^{-1}$) that is even higher than most state-of-the-art LIBs (300-400 Wh kg$^{-1}$). Such a heretofore unseen high energy density, along with intrinsic safety from its aqueous nature and the much lower cost of halide active materials as compared with the diversified transition metal oxides, are some of the many advantages of rechargeable Li-ion batteries of the invention.

Use of the anionic-redox reaction of halide anions (Br$^-$ and Cl$^-$), a composite electrode containing graphite with equimolar lithium halide salts ((LiBr)$_{0.5}$(LiCl)$_{0.5}$-graphite, hereafter denoted as LBC-G) was prepared as active material. The highly concentrated WiBS electrolyte confined the partially hydrated LiBr and LiCl inside the solid cathode matrix, while upon oxidation, Br$^0$ and Cl$^0$ are stabilized by their intercalation into graphitic structure, providing theoretical capacities of 309 mAh g$^{-1}$ for LiBr and 632 mAh g$^{-1}$ for LiCl at a high delithiation/lithiation potentials of 4.0-4.5 V vs. Li/Li$^+$, which are higher than those of sulfur at ~2.2 V or oxygen at ~3.0 V. The reversible redox reaction of these halide anions followed by their intercalation into graphite creates a densely-loaded stage I intercalation compound C$_{3.5}$[Br$_{0.5}$Cl$_{0.5}$], corresponding to an overall capacity of 243 mAh g$^{-1}$ (based on total mass of LBC-G cathode).

By coupling LBC-G cathode with a protected graphite anode disclosed by the present inventors (see Yang, C. et al. 4.0 V Aqueous Li-Ion Batteries. *Joule* 2017, 1, 122-132), a 4.0 V class aqueous full cell was created, delivering an energy density (460 Wh kg$^{-1}$) that is even higher than most state-of-the-art LIBs (300-400 Wh kg$^{-1}$). Such a heretofore unseen high energy density, along with intrinsic safety from its aqueous nature and the much lower cost of halide active materials as compared with the diversified transition metal oxides, are some of the many advantages of rechargeable Li-ion batteries of the invention.

This conversion-intercalation LBC-G chemistry distinctly differs from all graphite-intercalation chemistries by anions such as PF$_6^-$, BF$_4^-$, TFSI$^-$ in at least two aspects: Firstly, LBC-G cathode stores anions source (Br$^-$ and Cl$^-$) in highly dense solid state rather than in dilute liquid electrolyte. Therefore, the capacity is not restricted by salt solubility or electrolyte amount in principle. Secondly, during charge, the oxidized species in LBC-G are the bromide/chloride anions, and the graphite host stay nearly intact, while the graphite cathode in the so-called 'dual-ion' batteries is oxidized by hosting electron holes, and the anion intercalants (PF$_6^-$, BF$_4^-$, TFSI$^-$) maintain their chemical state. The small coulomb repulsions between Br and Cl intercalants, because of their near-zero oxidation states in graphite, enabled a high-density graphite-intercalation-compound (GIC) of C$_{3.5}$[H] (H=halogen), in sharp contrast to 'dual-ion' batteries where only dilute GICs with general formula C$_{24}^+$[X$^-$] or C$_{20}^+$[X$^-$] (X$^-$ =PF$_6^-$, BF$_4^-$, TFSI$^-$, etc) can be formed with capacities <120 mAh g$^{-1}$. In addition, LBC-G chemistry also differ from traditional conversion cathodes as transition metal halides (FeF$_2$, CuF$_2$, etc.) and anion redox couples (S/S$_n^{2-}$, O/O$^{2-}$, Br$_3^-$/Br$^-$, etc.). Compared to transition metal halides, the potential and energy of anionic redox are much higher than those of transition metal cationic redox. Moreover, the halogen intercalation into graphite in LBC-G is also much faster and more reversible than crystal reconstruction reaction in transition metal halides, which is always accompanied with large kinetics hysteresis, massive volume changes and irreversible particle disintegration. As for anion redox couples (S/S$_n^{2-}$, O/O$^{2-}$, Br$_3^-$/Br$^-$, etc.), although the dissolution of the intermedia also improved reaction kinetics, the final charging products are normally deposited or adsorbed on high surface area carbon host, leading to side reactions, parasitic shuttling effect and low volumetric energy densities. Using super-concentrated WiBS electrolyte allows halide anions in hydration layer that is thermodynamically immiscible with WiBS to be confined within the cathode solid composite during repeated cycling of LBC-G, while the highly reactive oxidation product (BrCl, gaseous at room temperature) is effectively stabilized by its intercalation in graphite, thereby ensuring the high reversibility of this conversion-intercalation chemistry.

LBC-G composite cathode was prepared by mixing anhydrous LiBr and LiCl with graphite powder at a mass ratio of 2:1:2 (corresponding to molar ratio of (LiBr)$_{0.5}$(LiCl)$_{0.5}$C$_{3.7}$). The electrochemical behavior of LBC-G composite cathode was evaluated in a three-electrode cell using active carbon (about 50 times the mass of the working electrode) as a counter electrode, Ag/AgCl as a reference electrode, and an aqueous gel polymer of 80 wt. % WiBS (21 mol kg$^{-1}$ lithium bis(trifluoromethane sulfonyl)imide (LiTFSI) –7 mol kg$^{-1}$ lithium trifluoromethane sulfonate (LiOTf) dissolved in water) and 20 wt. % polyethylene oxide (PEO) as electrolyte. Upon exposure to WiBS electrolyte (20 times the mass of the working electrode), the anhydrous LiBr—LiCl salts in LBC-G extract trace water (approximate 2.4%) from WiBS, forming a hydrated LiBr—LiCl layer on the surface of LBC-G (estimated overall formulations of hydrated salts of LiBr·0.34H$_2$O—LiCl·0.34H$_2$O), which accelerate the redox reaction of halogens in the form of solvated anions. FIG. 1. Meanwhile, this hydrated salt layer is thermodynamically phase-separated from the bulk WiBS electrolyte and builds dynamic water equilibrium. Such a liquefied layer allows for Li$^+$ transport but blocks the diffusion and potential undesired shuttling of halide ions, as evidenced by MD simulation as well as the extreme low Cl and Br content (<32 ppm) detected by chromatographic analysis in a WiBS electrolyte that has been equilibrated with LiCl—LiBr solution for 500 hours.

Figure 2:
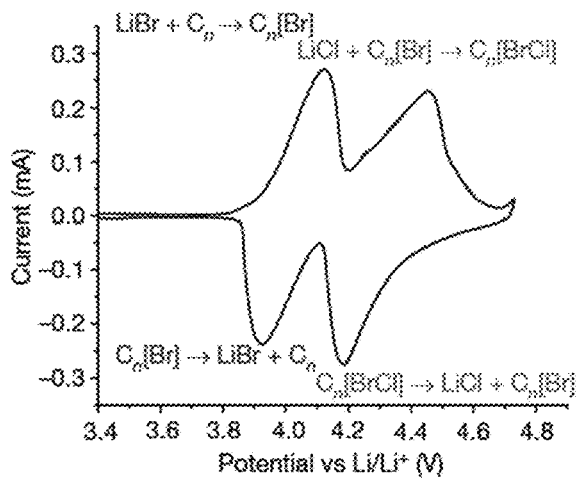
FIG. 2 is a cyclic voltammogram of LBC-G cathode between 3.2 and 4.9 V vs. $Li/Li^+$ at scan rate of 0.05 $mVs^{-1}$.
Figure 3:
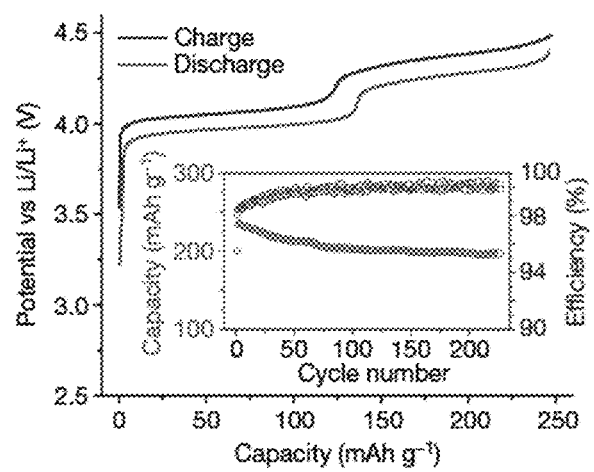
FIG. 3 is a galvanostatic charge/discharge profiles of LBC-G cathode at a current density of 80 mA $g^{-1}$. Insert: Discharge capacity retention and coulombic efficiencies.

The cyclic voltammetry (FIG. 2) and charge/discharge profiles (FIG. 3) of LBC-G indicated two distinct reactions at 4.0-4.2 V vs. Li/Li$^+$ for Br$^-$ intercalation and 4.2-4.5 V vs. Li/Li$^+$ for Cl$^-$ intercalation, respectively, which delivers a highly reversible discharge capacity of 243 mAh g$^{-1}$ (of the total mass of LBC-G composite including LiBr/LiCl salts and graphite), 82% of which is retained over 230 cycles at a coulombic efficiency of 100% after the 80th cycle at a current density of 80 mA g$^{-1}$ (0.2 C). The two-step redox reactions correspond to:

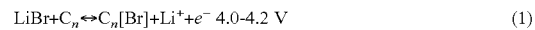

$$\text{LiBr} + C_n \leftrightarrow C_n[\text{Br}] + \text{Li}^+ + e^- \quad 4.0\text{-}4.2 \text{ V} \tag{1}$$

Figure 4:
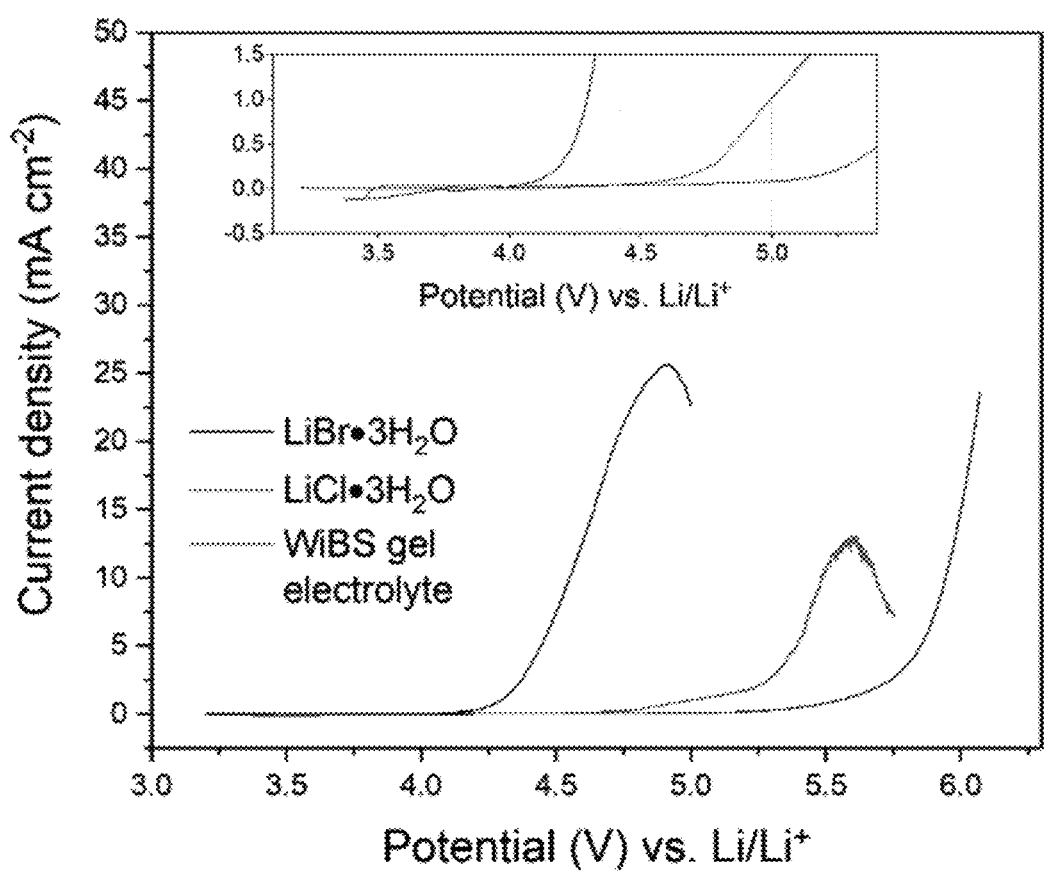
FIG. 4 is a linear sweep voltammetry of pure graphite electrode (with only PTFE binder) on Ti mesh current collector in $LiBr \cdot 3H_2O$, $LiCl \cdot 3H_2O$, and WiBS electrolyte with Ag/AgCl electrode as reference at 1 mV/s, showing absence of side reactions including corrosion of the current collector and oxidations of graphite and water before the onsets at ~4.0 V, 4.5 V and 5.0 V vs. Li/Li+, in according with the oxidations of Br–, Cl–, and water, respectively.

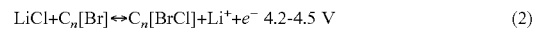

$$\text{LiCl} + C_n[\text{Br}] \leftrightarrow C_n[\text{BrCl}] + \text{Li}^+ + e^- \quad 4.2\text{-}4.5 \text{ V} \tag{2}$$

where n is the molar ratio of carbon atoms to the intercalated halogens in the GIC. During the charging process, Br$^-$ in hydrated layer with relatively lower redox potential is first electrochemically oxidized to near-zero oxidation valences (Br$^0$) and intercalated into nearby graphite interlayer, forming Br$_2$ GICs as C$_n$[Br] (eq. 1). Upon further charging, the oxidation of Cl$^-$ and intercalation of Cl$^0$ in hydrated layer occurs at a higher potential (eq. 2), which has not been observed hitherto, forming a mixed intercalation compound C$_n$[BrCl]. The oxidation of each halogen involves one-electron transfer and delivers an identical molar capacity for Br and Cl, respectively. Simultaneously, Li$^+$ exodus into the bulk electrolyte, and reduced at anodes. During discharge process, a reverse reaction occurs, i.e., Cl and Br successively de-intercalate from graphite interlayer, are reduced and recombine with the returning Li$^+$, forming both solid LiCl and LiBr crystals and liquefied halides outside of graphite host. Thus, all the active materials LiCl and LiBr are well retained within the solid electrode, experiencing no significant loss caused by dissolution and shuttling. The thermodynamics reaction potentials of LBC-G were confirmed by density functional theory (DFT) calculations. The fully charged product $C_{3.5}[Br_{0.5}Cl_{0.5}]$ of LBC-G composite realized the theoretical storage capacity of 251 mAh $g^{-1}$ at an average potential of ~4.2 V. In this conversion-intercalation chemistry, WiBS electrolyte plays a role in its electrochemical reversibility, because its water molecules do not oxidize until ~4.9 V vs. $Li/Li^{+1}$, making the halide oxidation/reduction that places at moderate potentials (4.0-4.5 V) to be reversible. As shown in FIG. 4, only the halogen is oxidized, while the Ti current collector and graphite stay intact in the operation potentials.

Figure 5:
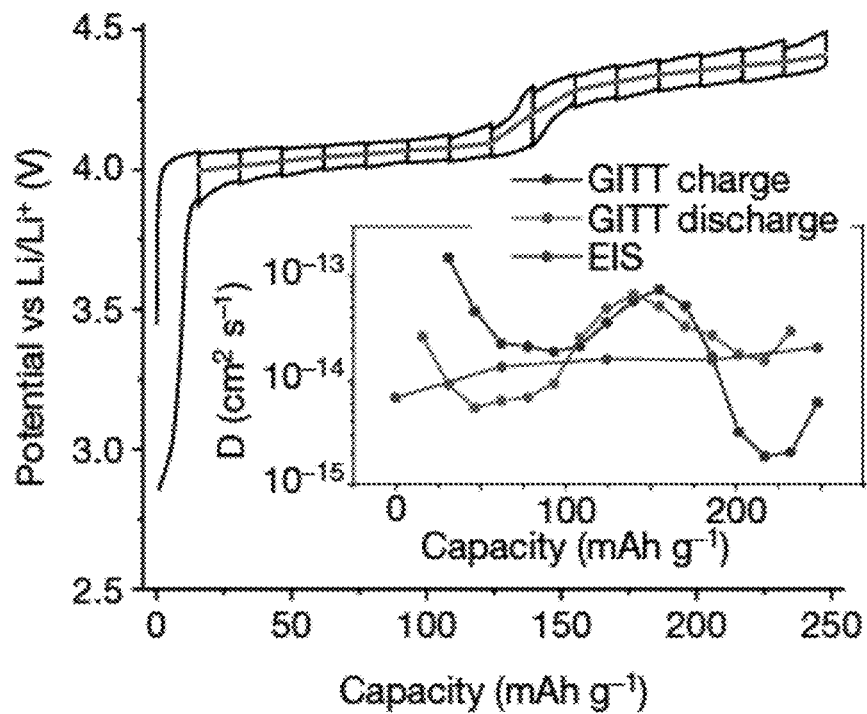
FIG. 5 is a graph of GITT characterization of LBC-G cathode at a current density of 80 mA $g^{-1}$. Red curve is quasi-equilibrium potential at different lithiation/de-lithiation stages, which was constructed from the average value of each open-circuit voltage period during charge/discharge. Inset: The finite diffusion coefficients D of reactants estimated from GITT and EIS measurements.
Figure 6:
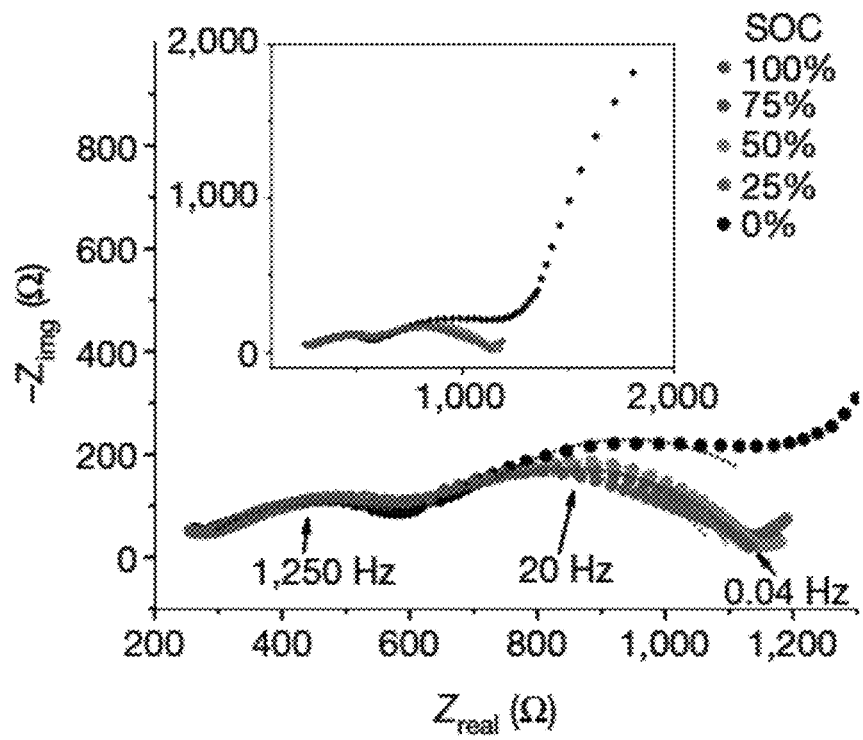
FIG. 6 is a Nyquist plots for LBC-G cathode obtained by EIS tests at various SOCs in a three-electrode cell. The dashed lines are the fitting curve by using the equivalent circuit. Inset: plots in a full scale.

Galvanostatic intermittent titration technique (GITT) was used to examine the quasi-equilibrium potentials and kinetics of reactions at different stages. The quasi-equilibrium potentials are ~4.05 V for $Br^-$ and ~4.35 V for $Cl^-$ oxidation/intercalation reactions, respectively (FIG. 5), while the total diffusion coefficients were estimated in a range of $10^{-15}$-$10^{-13}$ $cm^2\ s^{-1}$ (red and blue curves in the insert of FIG. 5). The diffusion coefficients of LBC-G cathodes were also investigated using electrochemical impedance spectroscopy (EIS), where Nyquist plots (FIG. 6) displayed two semicircles with the characteristic frequencies of ~1,250 Hz and ~20 Hz, respectively. The semicircle at the high frequency range is attributed to the charge transfer resistance on the surface of graphite matrix, while the semicircle at a middle frequency range corresponds to salt dissolution/precipitation and finite diffusion of reactants in hydrated layer, and the slant-tail at a low frequency range is due to the halogen diffusion in graphite. By fitting the Nyquist plots with the equivalent circuit, the apparent ionic diffusion coefficients (including dissolution/precipitation) of reactants was estimated to be $6.85 \times 10^{-15}$-$2.07 \times 10^{-14}$ $cm^2\ s^{-1}$ (green circles in the insert of FIG. 5), in excellent agreement with the estimated total diffusivity values from GITT measurements. Considering the extremely high diffusion coefficient of halogens in the graphite interlayer, the mass transfer of $Br^-$ and $Cl^-$ between solid salts and graphite surface constitutes the rate-determining step in this chemistry, which was also proved by their finite diffusion behavior.

LBC-G provides a practical gravimetric capacity of 231 mAh $g^{-1}$ (of total weight of electrode), volumetric capacity of 450 mAh $mL^{-1}$ (of total volume of electrode) at an average discharge voltage of 4.2 V vs. $Li/Li^+$, yielding an extremely high energy density of 970 Wh $kg^{-1}$, which is almost twice as much as Ni-, Co-, and Mn-based intercalation cathode materials, or comparable with sulfur conversion cathode. The volumetric energy density of LBC-G, however, is much higher than that of sulfur. With both high gravimetric and volumetric energy densities, the conversion-intercalation nature of LBC-G makes it one of the most useful cathode chemistry for the lithium-ion batteries.

Figure 7:
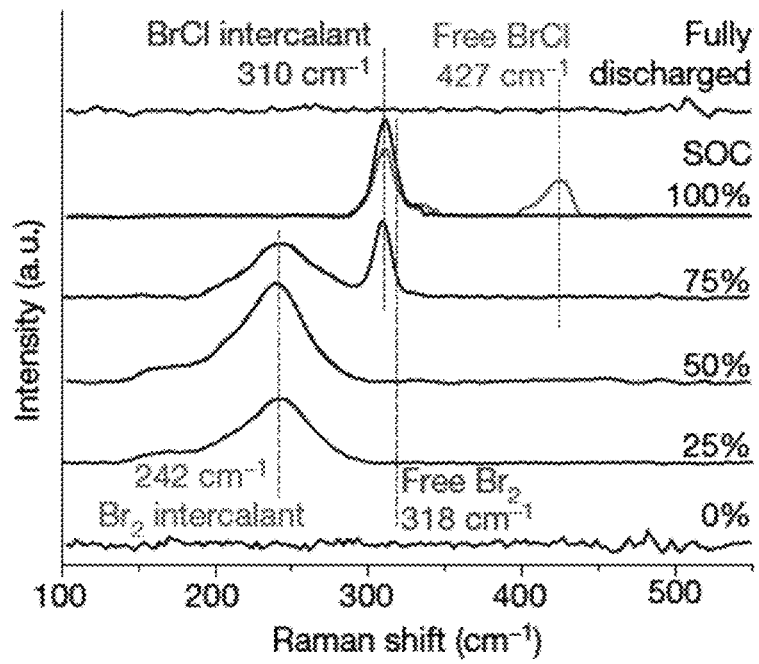
FIG. 7 is In situ Raman spectra (100-550 $cm^{-1}$) of LBC-G during the entire charge-discharge cycle, showing the evolutions of $Br_2$ and BrCl intercalants. Red line: Free BrCl signals detected only after deliberately destabilizing the graphite host with a strong laser beam, further confirming the BrCl intercalation. Background from quartz was removed.

In situ Raman spectroscopy (100-550 $cm^{-1}$) was performed to probe the intercalation mechanism of halogen species during charge/discharge of LBC-G (FIG. 7). With the states-of-charge (SOC) at 0%-50%, a characteristic peak ($\omega_0$=242 $cm^{-1}$) was detected, which corresponds to the intercalated $Br_2$ molecular stretch mode in graphite. Further charging introduced a new featured peak of BrCl intercalant ($\omega_0$=310 $cm^{-1}$), verified by a reference prepared via chemical intercalation of BrCl into graphite. The peak intensity of BrCl intercalant increases with charging of LBC-G to 4.5 V. The charge transfers with graphene layer weakened the interatomic bonds of halogen intercalants, causing the downshift in the frequencies from 318 $cm^{-1}$ for free $Br_2$ molecules (liquid) to 242 $cm^{-1}$ for $Br_2$ intercalant, and from 427 $cm^{-1}$ for free BrCl molecules (gaseous) to 310 $cm^{-1}$ for BrCl intercalant. It should be noted that during charging/discharging between 3.2 V and 4.5 V, no free $Br_2$ or BrCl peaks were ever detected, unless the fully intercalated BrCl GIC was deliberately destabilized with a high-intensity laser beam (red curve, FIG. 7). It is believed that all the halogen produced by the redox reactions of halide anions intercalated into the graphite structure instead of mere absorption on surface of graphite flakes. During discharging process, a fully reversible change in Raman spectra was observed.

Figure 8:
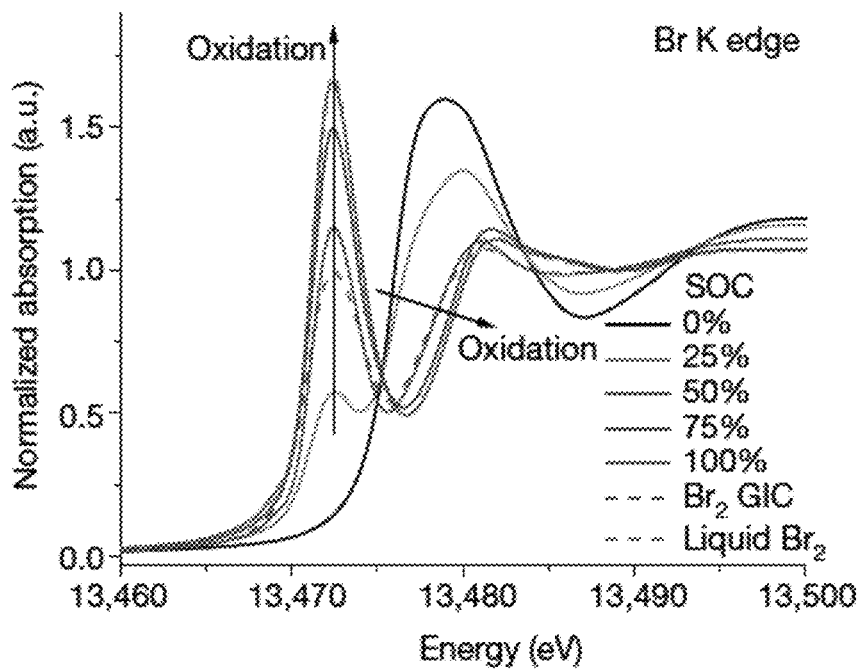
FIG. 8 (2b) is an ex situ Br K-edge XANES of LBC-G composite during its first charging process. Chemically intercalated $Br_2$ and liquid $Br_2$ as control samples (dash curves) were measured in the same cell configuration.
Figure 9:
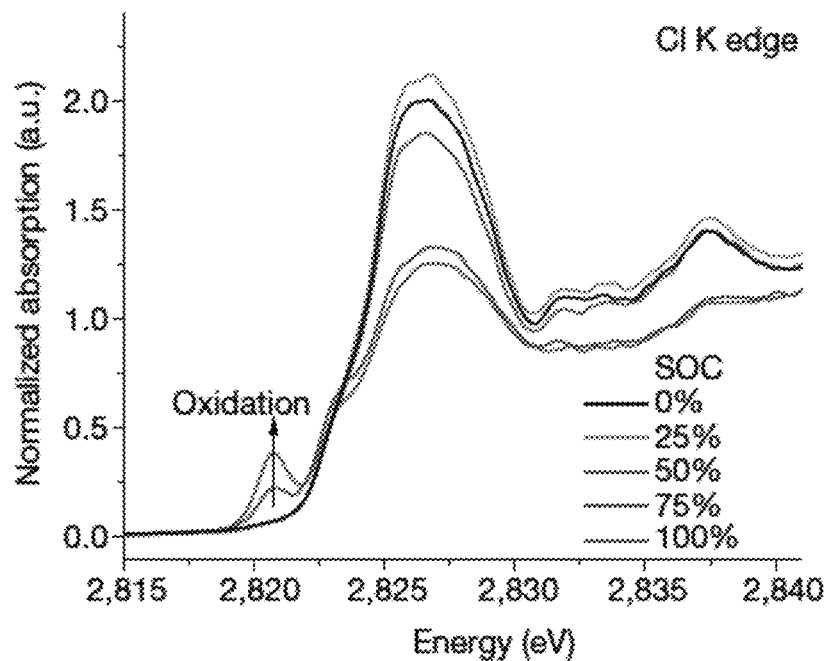
FIG. 9 (2c) is an ex situ Cl K-edge XANES of LBC-G composite during its first charging process.

The oxidation states of the halogens at various SOCs, which reflects their redox reaction sequence in LBC-G cathode, were monitored using ex situ X-ray absorption near edge structure (XANES) spectra. For Br K-edge, a distinct and sharp peak at ~13,473 eV, attributed to the Br intra-atomic 1s→4p transition, appeared instantly after the LBC-G cathode being charged. See FIG. 8. The intensity of this 'white line' peak, which reflects the hole density on Br 4p orbitals, was gradually enhanced accompanied by the blue-shifted absorption edge (1s→continuum, ~13,480 eV). It is the clear evidence that $Br^-$ took the holes and got oxidized to $Br^0$ from the beginning of charge process. For Cl K-edge (FIG. 9), only single absorption edge (1s→continuum) at ~2,825 eV was observed at first charge plateau (SOC: 0%-50%), indicating that all Cl stayed at -1 oxidation state. The oxidation of $Cl^-$ in LBC-G cathode appears to occur only at the second charge plateau (SOC: 50%-100%), as demonstrated by the appearance of its 'white line' peak (~2,821 eV) attributed to the Cl intra-atomic 1s→3p transition. By comparison with the reference spectra (dash lines in FIG. 8) of chemically intercalated $Br_2$ in GIC and liquid $Br_2$, apparently Br was mostly oxidized, but has not entirely reached $Br^0$ at the first charge plateau (SOC: 0%-50%). According to the distribution of electron densities in DFT simulations, the oxidation states of Br remain at approximately -0.16 in $Br_2$ GICs at 50% SOC due to the charge transfer with graphene layer. The subsequently intercalated Cl tends to associate with Br intercalated earlier, and the oxidation state of Br further increase closer to $Br^0$ (-0.05) due to its relatively lower electron negativity than Cl, while the oxidation state of Cl becomes -0.25.

Figure 10:
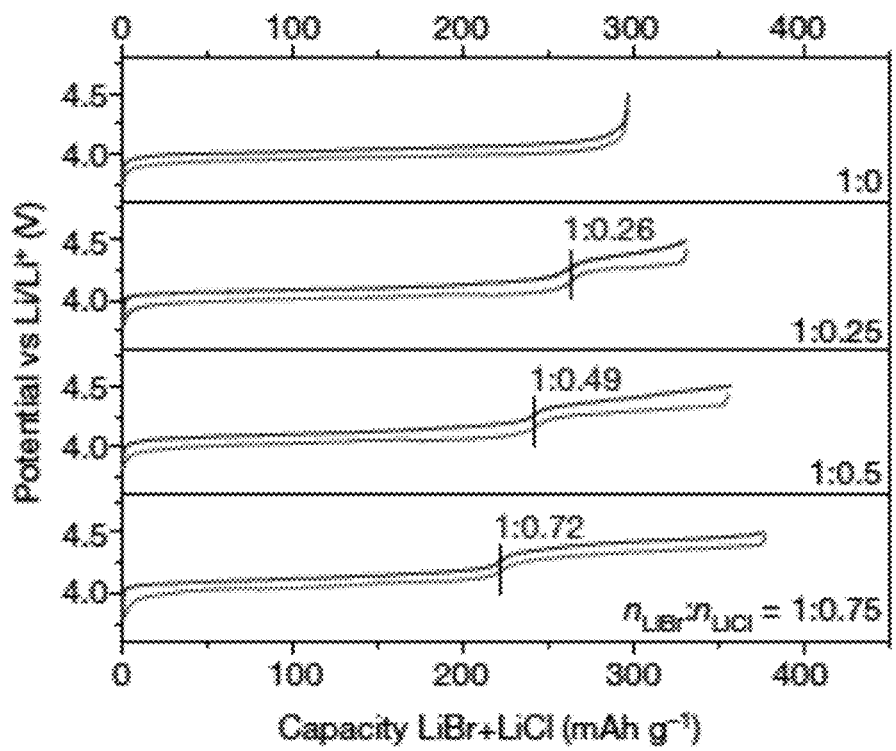
FIG. 10 illustrates the charge/discharge profiles of LBC-G composites with various mole ratios of LiBr/LiCl after the first charge at the current density of 80 mA $g^{-1}$. The specific capacities were estimated by the weight of LiBr and LiCl. The mole ratios were changed by only reducing the certain portions of LiCl from the original LiBr/LiCl/graphite composites.
Figure 11:
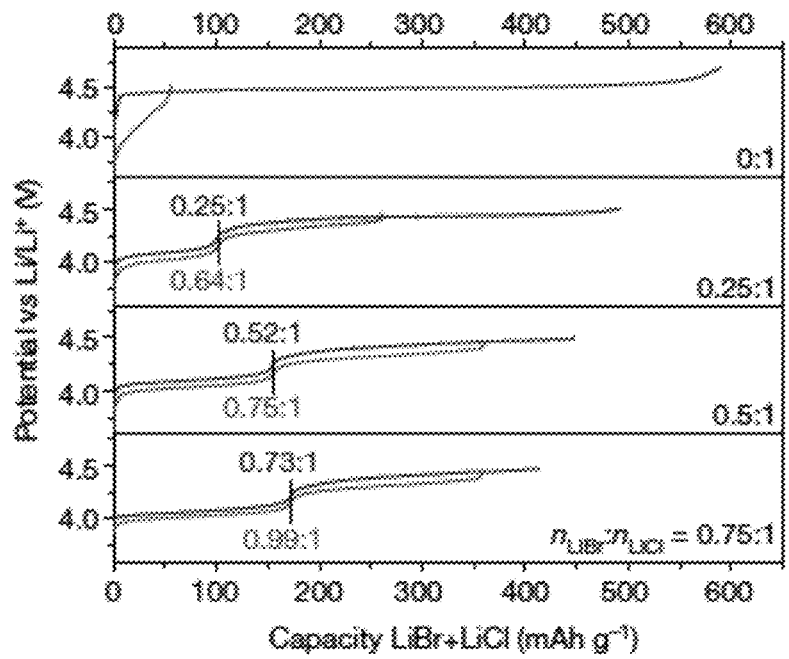
FIG. 11 (2f) illustrates the charge/discharge profiles of LBC-G composites with various mole ratios of LiBr/LiCl after the first charge at the current density of 80 mA $g^{-1}$. The specific capacities were estimated by the weight of LiBr and LiCl. The mole ratios were changed by only reducing the certain portions of LiBr from the original LiBr/LiCl/graphite composites.

This halogen conversion-intercalation mechanism in LBC-G cathodes is also supported by the charge/discharge profiles of LBC-G cathodes at different molar ratios of LiBr and LiCl. FIGS. 10 and 11. The capacity ratios of two charge/discharge plateaus are highly correlated with LiBr/LiCl molar ratio in the LBC-G cathodes, suggesting the two distinct potential plateaus are attributed to individual redox reactions of Br and Cl, respectively. The specific capacities calculated by the weights of LiBr in the LBC-G cathodes in the low-potential plateau (<4.25 V, FIG. 10) at a low rate of ≤0.2 C is very close to the theoretical redox capacity of LiBr (309 mAh/g), while that of the high-potential charging plateaus (>4.25 V), when calculated on the weights of LiCl, is close to the theoretical redox capacity of LiCl (632 mAh/g, FIG. 11). Interestingly, the coulombic efficiency of LBC-G cathodes in the high-voltage plateau increase with increasing of LiBr/LiCl ratio, indicating that the solo intercalation of $Cl^0$ in graphite is not thermodynamically stable, unless it is paired with a $Br^0$. This is because the most stable intercalation compound of $C_n[Br/Cl]$ in graphite is achieved at the LiBr/LiCl ratio to be close to 1:1. In sharp contrast, neat $(LiBr)_{0.5}(LiCl)_{0.5}$ in absence of a graphite host could deliver a high oxidation capacity during the initial charging, but the discharge capacity is very low due to the loss of gaseous halogens. Carbon host can improve the reversibility and discharge capacity by surface adsorption of halogens, while the coulombic efficiency further increases with their graphitization degree. It is believed that the graphite intercalation provides reversible and compact manner to accommodate the oxidation products of halogens.

Figure 12:
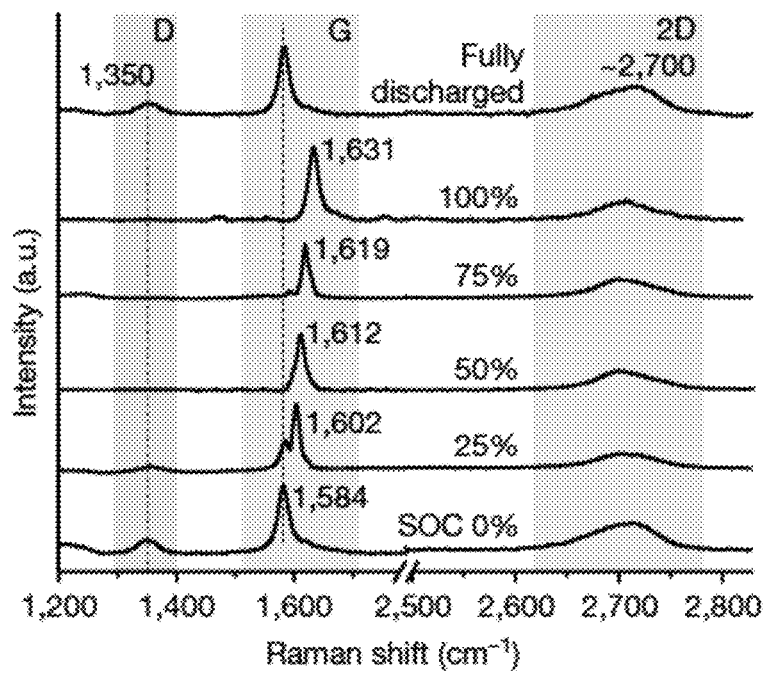
FIG. 12 (3a) is an in situ Raman spectra (1200-2850 $cm^{-1}$) of LBC-G during the entire charge-discharge cycle, showing the graphite structure evolution with $Br_2$ and BrCl intercalation/de-intercalation.

In situ Raman spectroscopy (1200-2850 $cm^{-1}$) exhibited the structure evolutions of graphite super-lattice during the halogen intercalation. FIG. 12. GIC stage number m, defined as the number of non-intercalated graphene layers between two closest layers populated by intercalated guest species, provides an important information. The graphite G band (1,584 $cm^{-1}$) gradually diminishes and splits into a doublet ($E_{2g2}$(b) mode and $E_{2g2}$(i) mode) upon halogen intercalation (charge), and evolves into a feature peak (at 1,612 $cm^{-1}$, $G_2$ band of $E_{2g2}$ (b) mode) of stages II GIC structure at 50% SOC. At the fully charged state, the peak further shifts to 1,631 $cm^{-1}$, indicating a stages I GIC structure. In addition, D band (1,350 $cm^{-1}$) of graphite disappears immediately after the graphite being intercalated, which is typical nature of GICs. During discharging process, a fully reversible change in Raman spectra is observed.

Figure 13:
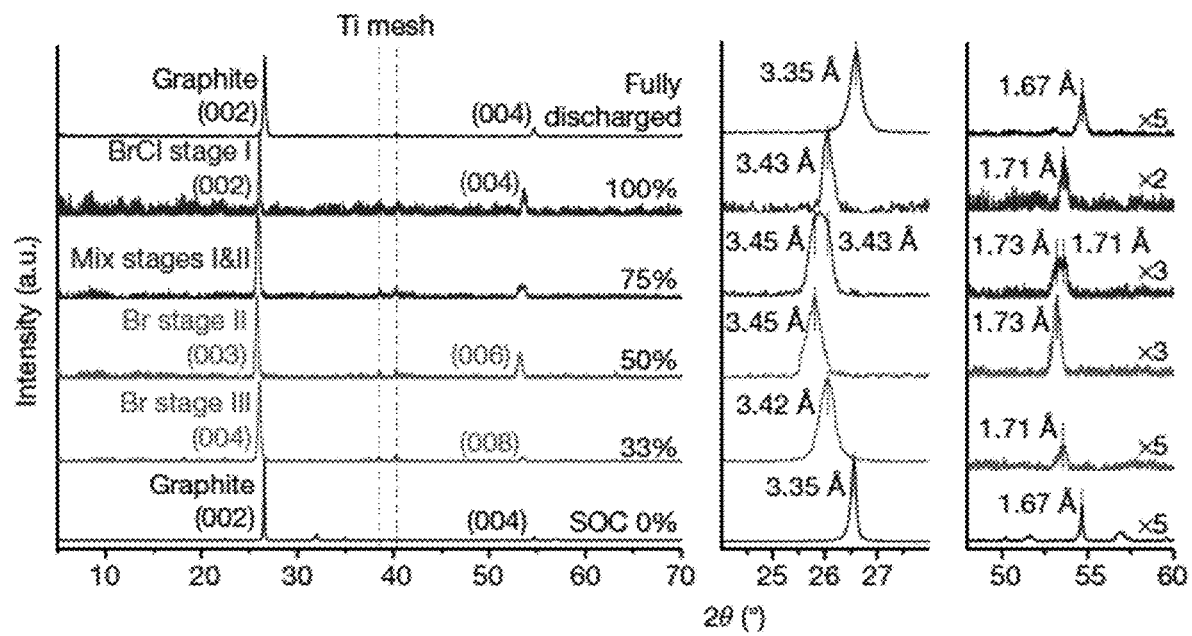
FIG. 13 (3b) is an ex situ XRD of LBC-G composite in various charging and discharging states through the second cycle. θ-2θ scan mode was employed with Cu Kα radiation (1.5418 Å) in reflection geometry. Left: overall spectra. Middle: magnified range of 2θ (24°-28°. Right: magnified range of 2θ (48°-60°). The peaks of titanium current collectors were used to calibrate the diffraction angles.
Figure 14:
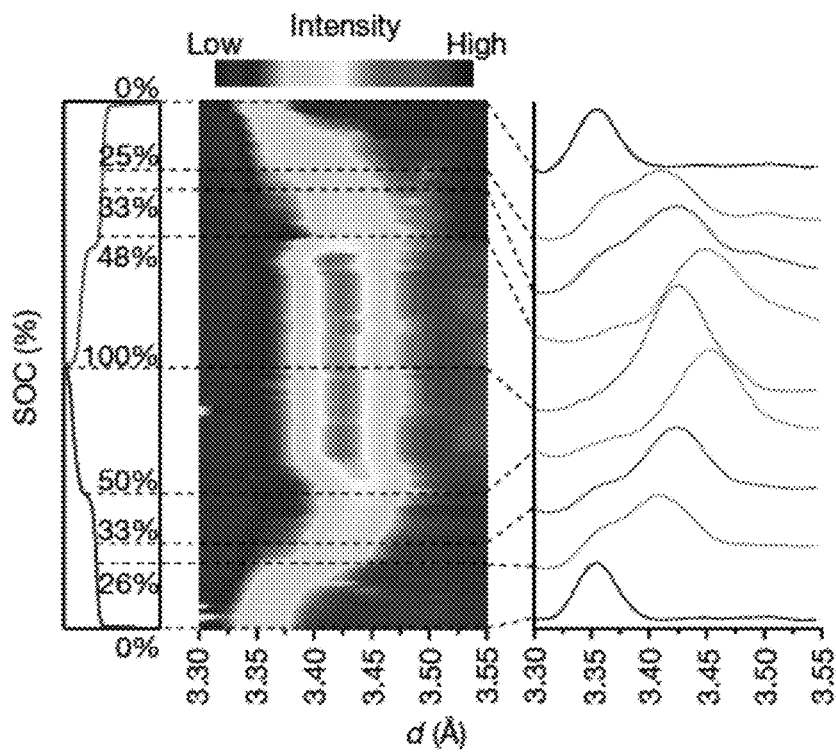
FIG. 14 (3c) is an in situ XRD patterns of (0 0 m+1) peak for LBC-G composite during a charge-discharge cycle, which were collected with high-energy X-ray radiation (wavelength of 0.1173 Å) in transmission geometry. Left: Corresponding voltage profile. Right: 2D contour of XRD patterns and representative curves illustrating the continuous evolution of d spacing (3.30-3.55 Å) for graphite host during intercalation/de-intercalation. The 2θ diffraction angles were converted to d spacing for convenience (see Methods).

X-ray diffraction (XRD) spectra revealed a detailed evolution of the staging structure for LBC-G cathode. Ex situ XRD of LBC-G cathodes (reflection geometry, FIG. 13) showed shifting dominated peak of (0 0 m+1) and subdominant peak of (0 0 2 m+2) during halogen intercalation/de-intercalation, further confirming the reference patterns. Close examinations suggested a successive progression of d spacing for the dominated peak from 3.35 Å for pristine graphite (0 0 2), to $d_{003}$~3.45 Å for stage II $Br_2$ GIC when the SOC of LBC-G increases from 0% to 50%. Since the intercalant gallery height was slightly lower, it is believed that further intercalation of Cl caused gradual shrink of d spacing, and eventually reaching stage I BrCl GIC ($d_{002}$~3.43 Å) at 100% SOC, consistent with the intercalation process revealed by Raman spectra. In situ XRD of LBC-G cathodes (FIG. 14) showed the d spacing of (0 0 m+1) experienced a continuous shifting during charge/discharge, indicating the gradual expansion of graphene interlayers with the accommodation of halogen atoms. A complete reversal of the above progression was again observed during the discharge process, indicating a full recovery of the graphitic structure after de-intercalation, which provides the basis for excellent reversibility. The formation of the most concentrated GIC at stage I ensures the high capacity of LBC-G conversion-intercalation chemistry. The reaction mechanism as proposed in reactions 1 and 2 is confirmed by the consistency between stage numbers of LBC-GIC and the corresponding charge/discharge capacities.

Figure 15:
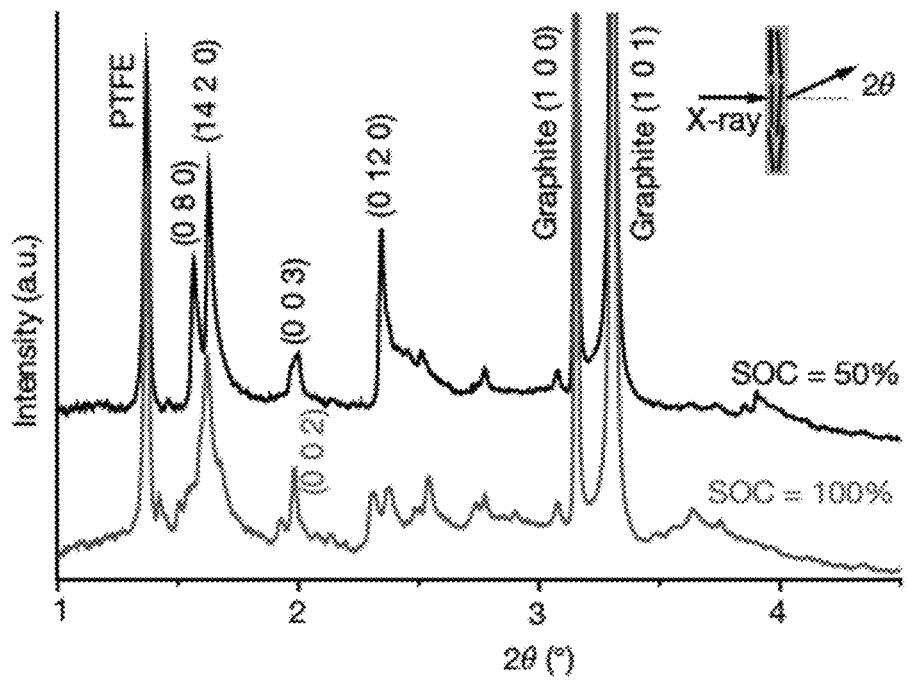
FIG. 15 (3d) is an ex situ High-energy XRD patterns for LBC-G composites (electrolyte and current collector removed) at 50% and 100% SOCs. High-energy transmission X-ray radiation (0.1173 Å) was set perpendicular to most of graphite flasks to reveal in-plane structure features.
Figure 16A:
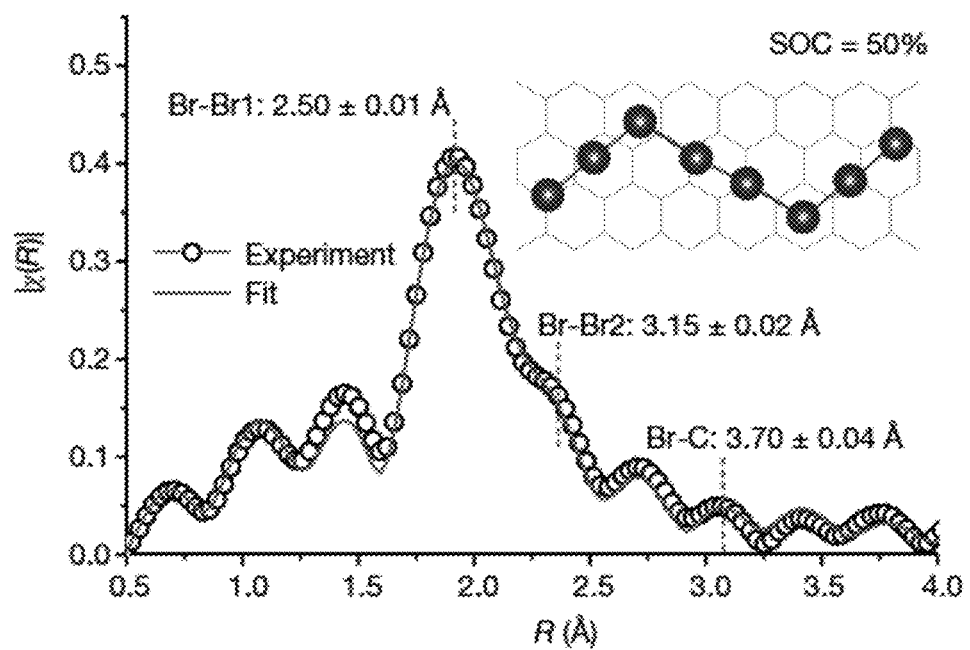
FIGS. 16A and 16B are the best-fit modes for Br EXAFS experimental data of Stage II $C_7[Br]$ (FIG. 16A, SOC=50%) and Stage I $C_{3.5}[Br_{0.5}Cl_{0.5}]$ (FIG. 16B, SOC=100%), respectively. The EXAFS spectra here in R Space are phase-uncorrected, so that the distance R in two Figures for two stages are not comparable but both are smaller than the actual values. Inset: In-plane configurations of Stage II $C_7[Br]$ and Stage I $C_{3.5}[Br_{0.5}]$ obtained from DFT simulations. Two sets of bond distances were marked as red lines (short) and blue lines (long).
Figure 16B:
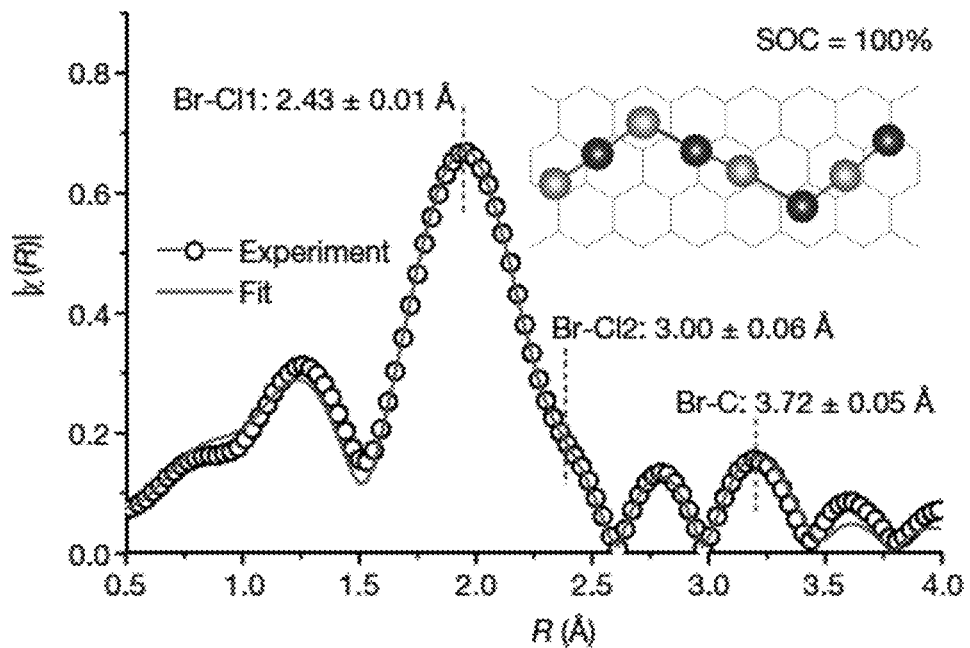

The in-plane configuration and coordination of halogen intercalants in GICs provide a method for determining the optimum intercalation concentration of LBC-G cathode chemistry. Since the in-plane intercalate structure was independent of intercalate concentration, the stoichiometry n of $C_n$[Br] and $C_n$[BrCl] always remain the same in each intercalation domain, regardless of the overall intercalation concentrations. Ex situ high-energy XRD (perpendicular incidence) for LBC-G cathodes (after removing the electrolyte and current collector) at 50% and 100% SOCs (FIG. 15) showed multiple asymmetric and overlapping peaks other than intrinsic peaks of graphene layers and PTFE binder, revealing mild level of long-range ordering of intercalant in-plane configurations. At 50% of SOC, only three peaks in low diffraction angles can be indexed according to the single-crystal $Br_2$ GIC reference, indicating multi-phase coexistence, localized disorder and structure strain. DFT simulations predicted multiple possible in-plane configurations based on two stoichiometries n=integer multiples of 7 and 8, all revealing zig-zag polymeric-like chains of —Br—Br— or —Br—Cl— with the nearest in-plane distance of 2.4-3.2 Å (insets of FIGS. 16A and 16B). Interestingly, all these models have quite similar potentials (within 20 mV), indicating that the real materials might be slightly disordered due to the coexistence of these idealized model structures, as evidenced by ex situ XRD patterns (FIG. 15). Molecular dynamics simulations predict that close Br—Br contacts due to slight Br excess or interaction between neighboring chains of intercalant can introduce disorder into the global structure. However, no signs of gassing and subsequent graphite exfoliation were observed over 100 ps of additional simulation under constant pressure conditions, even after a brief annealing to 360° C. and relaxation back to 60° C.

By fitting Br extended X-ray absorption fine structure (EXAFS) of LBC-G cathodes at SOC of 50% and 100% (FIGS. 16A and 16B, respectively), the most compatible models were $C_{7m}$[BrBr] and $C_{7m}$[BrCl], both with two sets of the nearest in-plane distances (Br—X1 and Br—X2, X=Br or Cl) instead of consistent distances for $C_{8m}$[BrBr] and $C_{8m}$[BrCl]. Due to the interaction with π electrons of graphene planes, the average values of nearest in-plane distances of halogen intercalants were 2.50 Å for Br—Br1 and 3.15 Å for Br—Br2, while 2.43 for Br—Cl1 and 3.00 Å for Br—Cl2, which were longer than bond distances of $Br_2$ (~2.30 Å) and BrCl (2.18 Å) free molecules. However, these nearest in-plane distances are much shorter than those of alkali metal GICs (4.31-4.92 Å) and large anions GICs (e.g. $PF_6^-$, $BF_4^-$, $TFSI^-$, 8-10 Å), which makes the halogen intercalants possess ones of the highest in-plane densities among all the GICs reported. Without being bound by any theory, it is believed that this high density packing is mainly due to the near-zero oxidation valence of halogen intercalants, which generates much lower coulomb repulsion force from average effective charge ~−0.16 per halogen atom, compared with higher than +0.90 for Li GIC and −1 for large anions.

Figure 17:
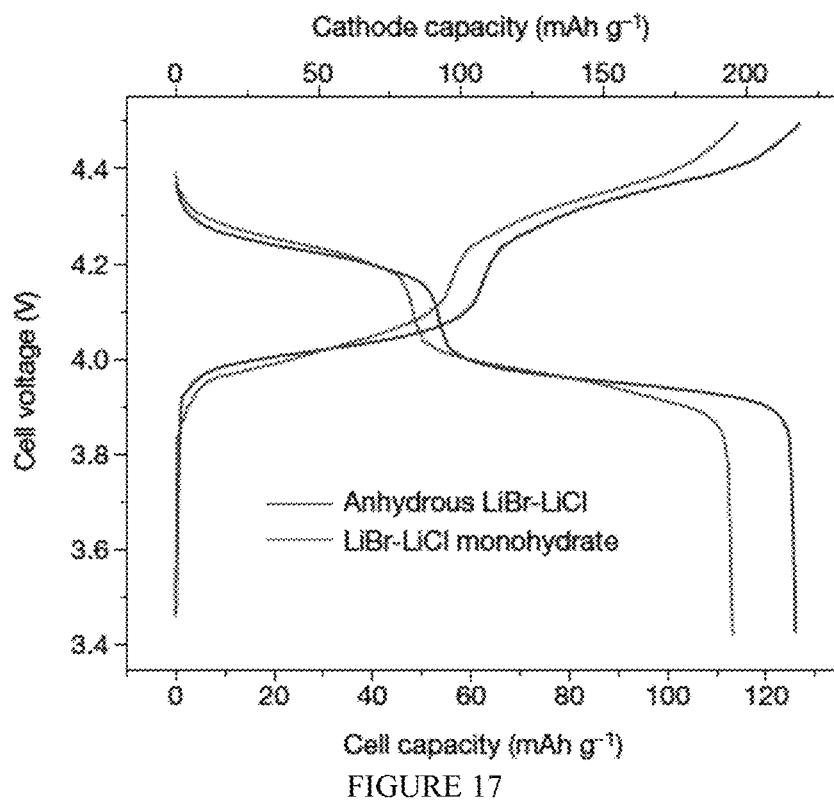
FIG. 17 (4a) is a graph showing a typical charge-discharge voltage profiles (the $3^{rd}$ cycles) of two Li-ion full cells with LBC-G cathodes consisting of anhydrous LiBr/LiCl (blue) or LiBr/LiCl monohydrates (red) and HFE/PEO protected graphite anodes. Charging and discharging were performed at 0.2 C (44 mA $g^{-1}$ for LBC-G cathode) at 25° C. The cell capacity was calculated on the basis of the cathode mass alone (upper X-axis) or the total mass of cathode and anode including binder and protective coating (bottom x-axis).
Figure 18:
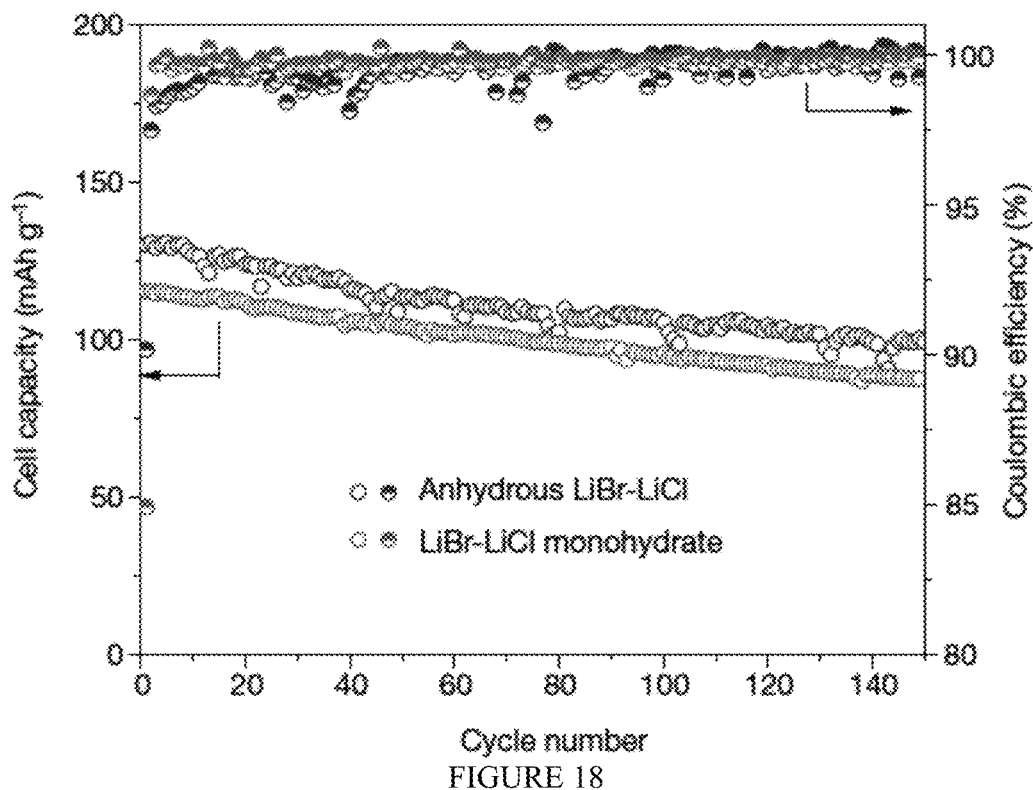
FIG. 18 (4b) is a graph showing the discharge capacities (on total mass of cathode and anode, open circles) and coulombic efficiencies (semi-solid circles) of full cells during cycling in one particular embodiment of lithium-ion battery of the invention.

Aqueous LIB full cells were constructed by using an aqueous gel electrolyte derived from WiBS and coupling LBC-G cathode with a graphite anode that is protected by a highly fluorinated ether (HFE) polymer gel. A stable discharge capacity of 127 mAh/g (of total anode and cathode mass) was obtained at an average voltage of 4.1 V at 0.2 C (FIG. 17), and 74% of this initial capacity was retained over 150 cycles at an average coulombic efficiency of 99.8% (FIG. 18). The low self-discharge rate demonstrated that the super-concentrated aqueous gel electrolyte effectively suppressed the undesired reactions, especially the water decomposition and halogen active material loss from cathode.

Figure 19:
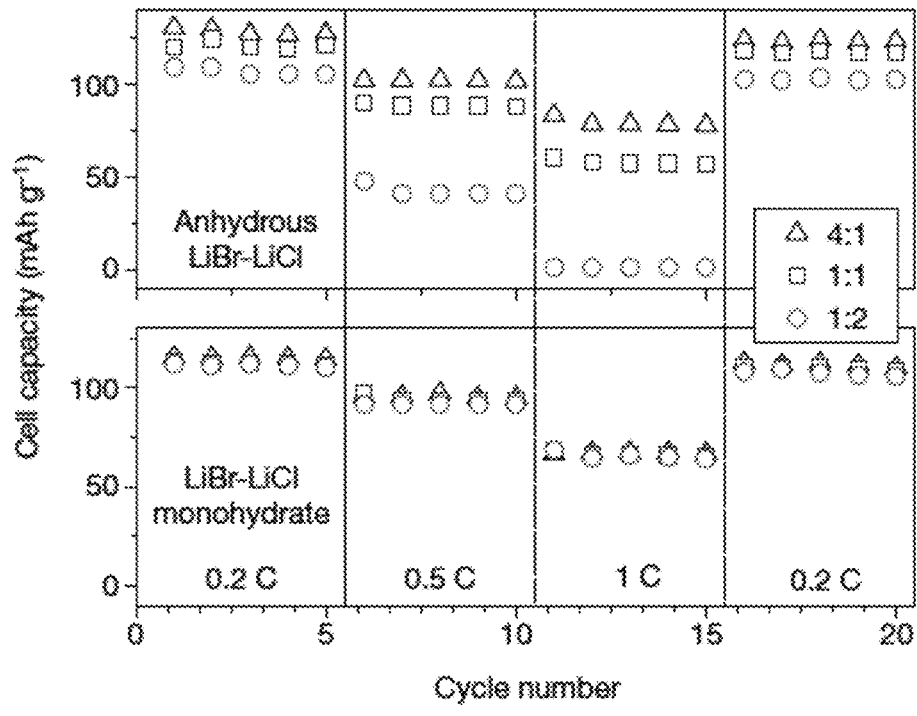
FIG. 19 (4c) shows discharge capacities calculated on total anode and cathode mass at various rates of one particular embodiment of LBC-G/graphite full cells of the invention with different electrolyte/electrodes (cathode+anode) mass ratios.

Since formation of hydrated LiBr/LiCl layer via extraction of 2.4 mol % water from WiBS is important to achieve high power density, the mass ratio of WiSB electrolyte to cathode may affect the rate performance of LBC-G cathodes. As shown in the upper part of FIG. 19, the rate capability was compromised when the electrolyte/electrodes (cathode+anode) mass ratio was reduced from 4:1 to 1:2. Thus, in some embodiments, the electrolyte/electrodes ratio is about 1:1, typically about 2:1, and often about 4:1. On the other hand, high ratio of electrolyte to electrode will reduce the energy density. One solution is to use LiBr and LiCl monohydrates (LiBr·$H_2O$ and LiCl·$H_2O$) to replace their anhydrous salts in preparing the LBC-G cathodes, which will remove the strong dependence on WiBS electrolyte as water source. LBC-G cathode with monohydrates showed almost identical charge/discharge profiles as the anhydrous one at low rate of 0.2 C except for a slightly lower specific capacity (FIGS. 17 and 18), which is due to the additional water mass brought by these monohydrates. The rate capability of LiBr·H$_2$O—LiCl·H$_2$O-G//G full cell, however, is much higher than its anhydrous counterpart, while the impact of electrolyte/electrodes mass ratio is minimized. Since the battery performances constructed with LiBr—LiCl monohydrates are independent of electrolyte amount, it is estimated that the energy density of such aqueous LIBs to be around 460 Wh kg$^{-1}$ of the total mass of cathode (with monohydrates) and anode. Such an energy density has never been reported for any known aqueous batteries, and are even higher than all the known state-of-the-art non-aqueous LIBs. Even after counting the electrolyte mass, the full cell energy density can still reach 304 Wh kg$^{-1}$. It should be remembered that this high energy density comes with intrinsic safety and environmental insensitivity because of the aqueous nature. This new aqueous cathode chemistry disclosed herein offers a battery that is cost effective, safe, and flexible along with higher energy.

Figure 20:
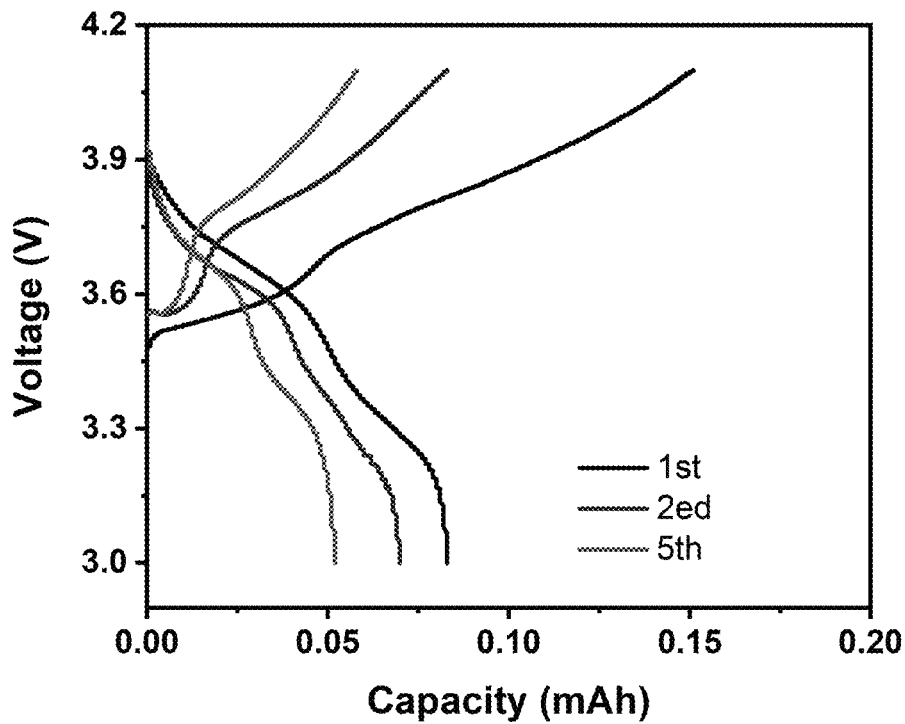
FIG. 20 shows a galvanostatic charge/discharge profiles of LBC-G cathode in 4 m $LiBF_4$/DME electrolyte at a current density of 80 mA $g^{-1}$.
Figure 21:
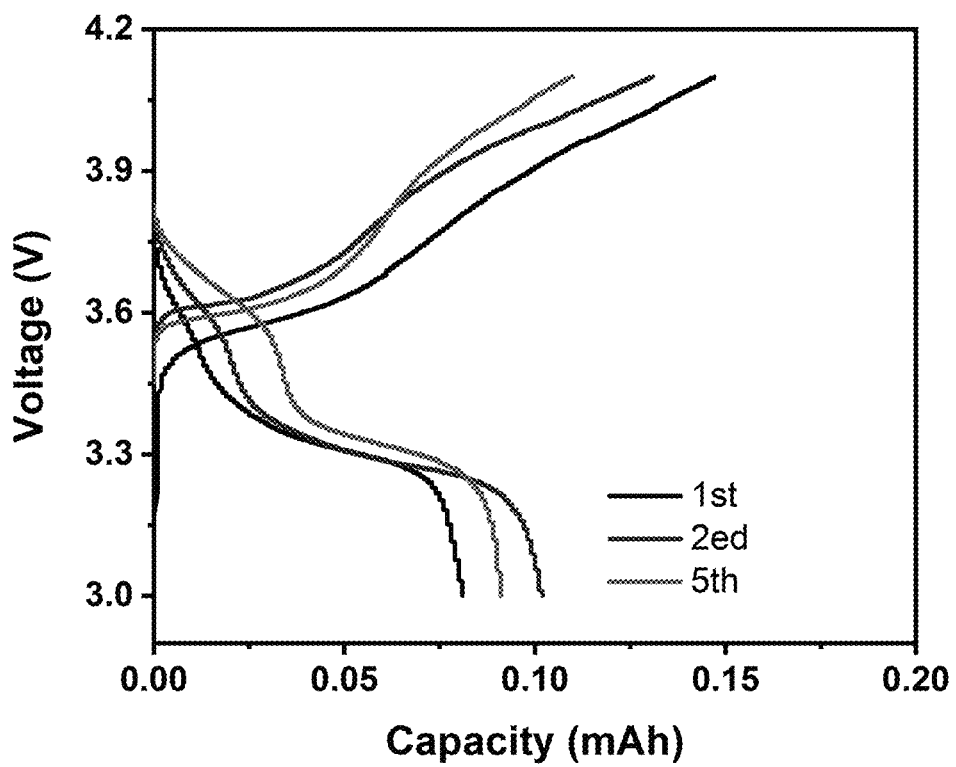
FIG. 21 shows a galvanostatic charge/discharge profiles of LBC-G cathode in Nafion solid-state-electrolyte electrolyte at a current density of 80 mA $g^{-1}$.

Non-aqueous LIB coin cells were constructed by using high concentration organic electrolyte and coupling LBC-G cathode with a lithium anode. A high discharge capacity of 151 mAh/g (based on cathode mass) was obtained at a current density of 80 mA g$^{-1}$ (FIG. 20). In analogy to aqueous system, the two-stage reactions involved the oxidation of Br$^{-1}$ (~3.6 V) and Cl$^{-1}$ (~3.8 V) and their subsequent intercalation into graphitic structure. The discharge capacity decreased to 83 mAh/g, corresponding to an initial coulombic efficiency of 55%. The steady decay is mainly attributed to the Br$_2$ dissolution. As for Nafion solid-state-electrolyte, the Br$_2$ dissolution can be effectively prevented, showing more stable charge and discharge performance (FIG. 21).

Additional objects, advantages, and novel features of this invention will become apparent to those skilled in the art upon examination of the following examples thereof, which are not intended to be limiting. In the Examples, procedures that are constructively reduced to practice are described in the present tense, and procedures that have been carried out in the laboratory are set forth in the past tense.

EXAMPLES

Preparation of electrodes. For the three-electrode (LiBr)$_{0.5}$(LiCl)$_{0.5}$-graphite composite (designated as sample LBC-G) was obtained by homogenously mixing anhydrous LiBr (99.9%, Sigma-Aldrich), LiCl (99.9%, Sigma-Aldrich) and synthetic graphite powder (TIMCAL TIMREX® KS4, average particle size ~4.1 µm) by zirconia ball milling for 15 min. The molar ratio of LiBr/LiCl was 1:1, while the mass ratio of LiBr/LiCl/graphite was ~2:1:2. In the full cells with LiBr/LiCl monohydrates, all the procedures were the same except replacing anhydrous LiBr/LiCl with LiBr·H$_2$O (99.95%, Sigma-Aldrich) and LiCl (99.95%, Sigma-Aldrich). Other control samples were obtained by adjusting the composites (LiCl/graphite ~1:3 for LiCl-graphite; LiBr/LiCl/titanium nanopowder ~2:1:60 for (LiBr)$_{0.5}$(LiCl)$_{0.5}$—Ti; LiBr/LiCl/active carbon ~2:1:9 for (LiBr)$_{0.5}$(LiCl)$_{0.5}$-AC; LiBr/LiCl/graphited acetylene black ~2:1:9 for (LiBr)$_{0.5}$(LiCl)$_{0.5}$—CB). Composite LBC-G cathodes were fabricated by compressing LBC-G composite and poly(vinylidenedifluoride) (PTFE) at a weight ratio of 95:5 on a titanium metal mesh (Alfa Aesar, 100 mesh). The areal loading of cathode material was ~38 mg cm$^{-2}$. The thickness of cathode is ~200 µm. Graphite anodes were fabricated by using synthetic graphite powder (TIMCAL TIMREX® KS44, particle size ~45.4 µm) and poly(vinylidenedifluoride) (PTFE) at a weight ratio of 9:1 on a stainless steel mesh (200 mesh).

Preparation of electrolytes. The liquid "water-in-bisalt" (WiBS) aqueous electrolytes were firstly prepared by dissolving 21 mol LiTFSI (98%, TCI Co., Ltd.) and 7 mol kg$^{-1}$ LiOTf (99.996%, Sigma-Aldrich) in water (HPLC grade). Aqueous gel electrolytes were prepared by mixing 20 wt. % poly(ethylene oxide) (PEO, average M$_v$~600,000, Sigma-Aldrich) with WiBS electrolyte and heated at 80° C. for 1 h in sealed glass molds. After cooling to the room temperature, sticky semi-solid WiBS gel electrolytes were obtained, which can be changed into any shape at 50° C.

The HFE-PEO gel protection coating was prepared. Briefly, the coating gel was prepared by mixing 1,1,2,2-tetrafluoroethyl-2',2',2'-trifluoroethyl ether (Daikin America or Apollo) with 0.5 M LiTFSI (denoted as LiTFSI-HFE gel) and 10 wt % PEO (Sigma-Aldrich) in HFE/FEC (volume ratio=95:5) and heated at 70° C. for 5 min under stirring.

Preparation of chemical GICs as reference samples. The chemically intercalated Br$_2$ and BrCl GICs as reference samples were synthetized following the reported procedure. See, for example, Heald, S. M. & Stern, E. A. EXAFS study of Br$_2$-graphite intercalation compounds. *Synthetic Metals* 1, 249-255, (1980); and Furdin, G., Bach, B. & Herold, A. A., *C. R. Acad. Sci., Ser. C* 271, 683, (1970). Briefly, Br$_2$ and BrCl GICs were prepared by exposing the graphite flasks (TIMCAL TIMREX® KS4) in high-contraction Br$_2$ (99.99%, Sigma-Aldrich) vapor and BrCl gas in well-sealed flasks for 2 hours. BrCl was prepared by mixing the Br$_2$ with equimolar of Cl$_2$ at −70° C., which obtained by the reaction of trichloroisocyanuric acid and hydrochloric acid.

Electrochemical measurements. In the three-electrode cells, LBC-G electrodes (or other control electrodes) were used as working electrode, active carbon as counter electrode, and Ag/AgCl as reference electrode. The mass ratio of working electrode vs. electrolyte was 1:20. The three-electrode cells were then galvanostatically charged/discharged using a Land BT2000 battery test system (Wuhan, China) at room temperature. Cyclic voltammetry was carried out using a CHI 600E electrochemical work station. The GITT experiment was performed in a three-electrode device with the same electrode configuration. The cycling protocol consists of 0.2 C current pulses for 20 min alternated with 120 min OCV periods to reach quasi-equilibrium potentials. The apparent ionic diffusion coefficients (D) of reactants in the LBC-G cathode at the different state of charge and discharge were estimated by the GITT measurement using the following relations:

$$D = \frac{4}{\pi}\left(\frac{IV_m}{FS}\right)^2\left(\frac{dE/dx}{dE/dt^{1/2}}\right)^2 \quad (3)$$

where I is the applied constant current density, $V_m$ is the molar volume of partially hydrated LiBr/LiCl, F is the Faraday constant (96,486 C mol$^{-1}$), S is the contact area between electrolyte and active materials, dE/dx is the slope of the coulometric titration curve at composition x and $dE/dt^{1/2}$ can be obtained from the plot of the transient voltage versus the square root of time during constant current pulse. The four-point EIS measurement was performed with Gamary 345 interface 1000 using 5 mV perturbation with the desired frequency range.

The full cells were assembled as a CR2032-type coin cell using LBC-G as cathode, and either sulfur-carbon or graphite electrodes as the anodes. The cathode/anode mass ratios were set at 1.38:1 for graphite anode cell. A titanium metal foil disk was applied between cathode and coin cell case to prevent corrosion. WiBS gel electrolyte was press into films and applied in the coin cells as both electrolyte and separator. The mass ratio of total electrodes vs. electrolyte was in the range from 1:4 to 2:1. After assembly, the cell was heated to 50° C. for GPE self-healing. The full cells were then cycled galvanostatically on a Land BT2000 battery test system (Wuhan, China) at room temperature.

The specific (gravimetric or volumetric) energy densities (E) of full cells were calculated by $$E = C \times U \quad (4)$$

where C was the specific (gravimetric or volumetric) cell capacity and U was the average output cell voltage. The gravimetric capacity $C_m$ was calculated by $$C_m = \frac{C_{cell}}{m_{cathode} + m_{anode}} \quad (5)$$

where $C_{cell}$ was the absolute cell capacity. $m_{cathode}$ was the total mass of cathode, including LiBr, LiCl, graphite and PTFE binder. $m_{anode}$ was the total mass of anode, including graphite, PTFE binder and the polymer passivation coating.

In situ Raman and XRD studies. For in situ Raman study, a LBC-G full cell (in a coin cell configuration) was charged and discharged at 0.1 C. A quartz optical window ($\phi$=5 mm) was applied on cathode side. Raman spectra were collected with a Horiba Jobin Yvon Labram Aramis using a laser (wavelength=532 nm) between 3500 and 60 cm$^{-1}$. 4×4 points of data were collected to get high signal to noise ratios.

For ex situ X-ray diffraction (XRD) study, the LBC-G electrodes (working electrodes) were retracted from three-electrode cell after being charged/discharged to certain SOCs at 0.1 C. For in situ X-ray diffraction (XRD) study, a full cell (in a coin cell configuration) was charged and discharged at 0.1 C. Kapton windows ($\phi$=3 mm) were applied on both sides of coin cells, where anode was deliberately placed to avoid the beam passage through the window. X-ray diffraction patterns were recorded on Bruker D8 Advance X-ray diffraction, with Cu K$\alpha$ radiation in grazing-incidence geometry. High-energy synchrotron XRD measurements were carried out at the 11-ID-C beamline of the Advanced Photon Source (APS), Argonne National Laboratory. A high-energy X-ray with beam size of 0.2 mm×0.2 mm and wavelength of 0.1173 Å was used to obtain two-dimensional (2D) diffraction patterns in the transmission geometry. X-ray patterns were recorded with a Perkin-Elmer large-area detector placed at 1800 mm from the battery cells. The interval between the consequent diffraction patterns was 5 min. The obtained 2D diffraction patterns were calibrated using a standard $CeO_2$ sample and converted to 1D patterns using Fit2D software.

The periodic repeat distance ($I_C$), the intercalant gallery height ($d_i$) of GICs can be calculated using the following equation:

$$I_C = d_i + 3.35 \text{ Å} \times (m-1) = l \times d_{obs} \quad (5)$$

where l is the index of (0 0 l) planes oriented in the stacking direction and $d_{obs}$ is the observed value of the spacing between two adjacent planes in XRD patterns, which can be calculated from diffraction angles by Bragg's law. The d spacing of pristine graphite is 3.35 Å. The intensity pattern is commonly found for a stage m graphite intercalation compound (GIC), where the most dominant peak is the (0 0 m+1). The d spacing values of (0 0 m+1) were calculated from XRD data by Bragg's law, while the most dominant stage phase of the observed GIC can be assigned.

Ex situ XANES and EXAFS studies. Ex situ X-ray absorption spectroscopy (XAS) measurements were conducted on the same cell configuration used for in situ XRD measurements. The experiments were carried out in transition mode at the beamline 20-BM-B of APS, Argonne National Laboratory. The XANES measurements were performed at the K edge of bromine (13474 eV) and chlorine (2825 eV) to monitor the change of valence state of Br and Cl in cathode and the energy calibration was performed using the first derivative point of the XANES spectrum of Bi ($L_{III}$-edge=13419 eV). During the Cl measurement, entire X-ray beam, the samples and detector were protected by helium gas. The reference spectra were collected for each in situ spectrum where Bismuth metal foil was placed in the reference channel. The EXAFS spectra were aligned, merged, and normalized using Athena. The coin cells were charged to certain voltages with a constant current before the measurements.

Athena program was first used to process experimental x-ray absorption data to extract normalized oscillation amplitude $\chi^{exp}(k)$ and the photoelectron wave number k is defined by $k=\sqrt{2m(E-E_0)}/\hbar$, where $E_0$ is the absorption edge energy. The theoretical calculated $\chi^{th}(k)$ is given by EXAFS equation:

$$\chi^{th}(k) = \sum_j \frac{S_0^2 N_j f_j(k)}{k R_j^2} e^{-2k^2 \sigma_j^2} e^{-2r_j/\lambda(k)} \sin[2kR_j + \delta_j(k, r_j)] \quad (5)$$

where j indicates a shell with identical backscatters, $N_j$ is the coordination number of the shell, $f_j$ is the backscattering amplitude, $R_j$ is the average distance, $\sigma_j$ mean square variation, $\delta_j$ is the scattering phase shift, $\lambda$ is the effective mean free path and $S_0^2$ is the amplitude reduction factor, FEFF6 was used to calculate $f_j$, $\delta_j$ and $\lambda$. Fitting to the experimental data to refine structure parameters $S_0^2$, $N_j$, $R_j$, $\sigma^2$ is done using Artemis program. The initial crystal structures for fitting are starting from DFT optimized Stage II $C_7[Br]$ and Stage I $C_{3.5}[Br_{0.5}Cl_{0.5}]$. $S_0^2$ was fixed at 1.0. Two ΔE were used in the fitting, one for the Br—Br (or Cl) paths, and the other one for the left Br—C paths.

SEM imaging and specific surface area measurement. SEM of the cycled cathode was performed in a Hitachi S-4700 operating at 5 kV. Specific surface areas of the samples were characterized by $N_2$ adsorption by means of a Micromeritics ASAP 2020 Porosimeter Test Station. Samples were degassed (in a vacuum) at 180° C. for 12 h before the test. The specific surface areas were calculated using the BET method from the adsorption branch.

Molecular dynamics simulations of LiBr in WiSE. MD simulations were performed on 18 m (mol salt/kg solvent) LiBr in water and a mixed salt 18 m LiBr+21 m LiTFSI in water at 363 K. MD simulations utilized a previously modified CHARMM $H_2O$ force field[47] in conjunction with the APPLE&P many-body polarizable force field for LiTFSI in $H_2O$ that predicted ionic conductivity, ion and water self-diffusion coefficients, viscosity and density of LiTFSI-$H_2O$ in excellent agreement with experiments over a wide range of salt concentrations from 5 m to 21 m.

A parallel version of the in-house developed MD simulation package is used for MD simulations. The 18 m LiBr in H$_2$O simulation cell contained 448 LiBr and 1390 H$_2$O molecules. The mixed salt MD simulation cell contained 1380 H$_2$O, 512 LiTFSI and 448 LiBr. All simulated (LiTFSI)$_n$(LiBr)$_m$(H$_2$O)$_k$ complexes resulting in large simulation cells of 70 and 95 Å. The simulation box dimensions were gradually decreased to 60 Å. NPT simulations were performed for 2 ns at 363 K for the mixed salt system at 363 K using a modified force field with the increased repulsion between Br/Br and TFSI/TFSI anions in order to evenly disperse them through the simulations box. After 9 ns of MD simulations in NPT ensemble LiBr(H$_2$O)$_n$ largely separated from the LiTFSI(H$_2$O)$_m$ domain. Such behavior is indicative of the initial stages of phase-separation and is in accord with experimental observations.

The Ewald summation method was utilized in MD simulations for handling the electrostatic interactions between permanent charges with permanent charges and permanent charges with induced dipole moments with k=6$^3$ vectors. Multiple timestep integration was employed with an inner timestep of 0.5 fs (bonded interactions); a central time step of 1.5 fs for all nonbonded interactions within a truncation distance of 7.0-8.0 Å and an outer timestep of 3.0 fs for all nonbonded interactions between 7.0 Å and the nonbonded truncation distance of the smaller of 19 Å. The reciprocal part of Ewald was updated only at the largest of the multiple time steps. A Nose-Hoover thermostat and a barostat were used to control the temperature and pressure with the associated frequencies of 10$^{-2}$ and 0.1×10$^{-4}$ fs. The atomic coordinates were saved every 2 ps for post-analysis.

Ability of MD simulations using atomic dipole polarizable APPLE&P force field to predict density and conductivity of 18 m LiBr in H$_2$O was examined at 333 K. After 3 ns equilibration in NPT ensemble, 8 ns MD simulations in NVT ensemble predicted electrolyte density of 1649 kg m$^{-3}$, which is 0.8% higher than experimental density of 1636.5 kg m$^{-3}$.[50] Ionic conductivity ($\sigma$) was extracted using the Einstein relations shown in the following equation:

$$\sigma = \lim_{t \to \infty} \frac{e^2}{6tVk_BT} \sum_{i,j}^{N} z_i z_j < ([R_i(t) - R_i(0)])([R_j(t) - R_j(0)]) > \quad (6)$$

where e is the electron charge, V is the volume of the simulation box, $k_B$ is Boltzmann's constant, T is the temperature, t is time, $z_i$ and $z_j$ are the Li$^+$ and Br$^-$ charges, $R^i(t)$ is the displacement of the ion i during time t, < > denote the ensemble average and N is the number of diffusing. Due to the finite size of the simulation cell, long range hydrodynamic interactions restrict diffusion. The leading order finite size correction (FSC) to the self-diffusion coefficient is given by the following equation:

$$\Delta D^{FSC} = \frac{2.837 k_B T}{6\pi \eta L} \quad (7)$$

where $k_B$ is the Boltzmann constant, T is temperature, L is a linear dimension of the simulation periodic cell and is viscosity. After FCS correction, MD simulations predicted conductivity of 18 m LiBr electrolyte to be 75 mS/cm that is 30% lower than the experimentally determined conductivity of 98.89 mS/cm but is sufficiently accurate for the highly concentrated electrolyte.

DFT simulations of intercalation structure configuration. All calculations were performed using DFT with a plane wave basis set and the projector augmented wave (PAW) method, as implemented in the Vienna Ab Initio Simulation Package (VASP). The Perdew-Burke-Ernzerhof (PBE) functional in the Generalized Gradient Approximation (GGA) was employed to calculate the exchange-correlation energy. An energy cutoff of 580 eV was used for the plane wave basis, and the Brillouin zone was sampled using the Monkhorst-Pack scheme. The van der Waals density functional (vdW-DF) of optB86b was used to correct Van der Waals energies to get accurate interlayer spacing values in all cases. Two sets of possible configurations for C$_7$[Br], C$_{3.5}$[Br$_{0.5}$Cl$_{0.5}$] and C$_8$[Br], C$_4$[Br$_{0.5}$Cl$_{0.5}$] were taken into consideration. In these configurations the Br and Cl atoms were initialized randomly. The geometry optimizations were performed using the conjugated gradient method, and the convergence threshold is set to be 10$^{-5}$ eV in energy and 0.01 eV/A in force. The charge difference plots were obtained by subtracting the charge density of both graphite and Br (BrCl) from the charge density of C$_7$[Br] (C$_{3.5}$[Br$_{0.5}$Cl$_{0.5}$]), respectively. The charge distribution on the atoms were determined using the Bader analysis method. Visualization of the structures were made using VESTA software.

Intercalation voltage step profile simulation. Intercalation voltage profiles were computed with CP2K v5.1 using the dispersion corrected (D3) PBE functional and double-$\zeta$ (triple-$\zeta$ for bromide) short-range, molecularly optimized valence basis sets and appropriate Goedecker-Teter-Hutter (GTH) pseudopotentials for core electrons. The plane wave energy cutoff was set to 1000 Ry and the Brillouin zone was sampled at the $\Gamma$ point only. Geometry and cell optimizations were converged to a max change in atomic positions between steps of 0.0005 au. The other convergence criteria were left at their defaults.

The intercalation voltage ($E_{int}$) against Li$^+$/Li can be computed from a series of energy calculations, assuming a negligible entropic contribution, as:

$$E_{int} = \frac{E(GrX) - E(Gr) + n_X E_{desolv}(LiX) - n_X E_{gas}(LiX) + n_X E_b(Li)}{n_X} \quad (8)$$

where $n_x$ is the number of anions, E(GrX) is the energy of the intercalated graphite gallery, E(Gr) is the energy of pure graphite in AB-stacking, $E_{desolv}$(LiX) is the desolvation energy of a LiX contact ion pair using the cluster-continuum method (with up to 8 explicit waters) from Gaussian calculations with PBEPBE+D3/6-31G(d), $E_{gas}$(LiX) is the energy of the LiX contact ion pair in a 10 Å×10 Å×10 Å cell, and $E_b$(Li) is the energy per Li in bulk metal (−204.1894 eV/Li). For stages I-IV and VI, 12 layers of carbon were modeled. Stage V was modeled with 10 layers of carbon. Each layer consisted of 112 carbon atoms.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. All references cited herein are incorporated by reference in their entirety.

What is claimed is:

1. A rechargeable lithium-ion battery comprising:
   a composite cathode comprising at least one lithium salt and graphite;
   an aqueous electrolyte; and
   an anode,
   wherein the rechargeable lithium-ion battery has a capacity of greater than 200 mAh/g.

2. The rechargeable lithium-ion battery according to claim 1, wherein said oxidation products of at least one lithium salt is intercalated within said graphite.

3. The rechargeable lithium-ion battery according to claim 1, wherein said composite cathode comprises a plurality of lithium salts.

4. The rechargeable lithium-ion battery according to claim 1, wherein said composite cathode comprises lithium chloride, lithium bromide, lithium iodide, lithium fluoride, and other halogen salts or a combination thereof.

5. The rechargeable lithium-ion battery according to claim 1 having an energy density of at least 400 Wh/kg.

6. The rechargeable lithium-ion battery according to claim 1, wherein a coulombic efficiency of said rechargeable lithium-ion battery is at least 95%.

7. The rechargeable lithium-ion battery according to claim 1, wherein said rechargeable lithium-ion battery has potential of at least about 4 V vs. Li/Li$^+$.

8. The rechargeable lithium-ion battery according to claim 1, wherein said aqueous electrolyte comprises water-in-bisalt electrolyte (WiBS), highly concentrated organic electrolytes having a concentration of at least 2m, all-solid-state ceramic electrolytes, or a combination thereof.

9. The rechargeable lithium-ion battery according to claim 8, wherein said WiBS comprises lithium bis(trifluoromethanesulfonyl)imide (LiTFSI), lithium trifluoromethanesulfonate (LiOTf), lithium bis(fluorosulfonyl)imide (LiFSI), lithium hexafluorophosphate (LiPF$_6$), lithium tetrafluoroborate (LiBF$_4$), lithium difluoro(oxalato)borate (LiDFOB), lithium hexafluoroarsenate (LiAsF$_6$), Lithium perchlorate (LiClO$_4$), Lithium nitrate (LiNO$_3$) or a mixture thereof.

10. A method for producing a lithium salt-graphite composite cathode for use in a rechargeable lithium ion battery, said method comprising compressing a mixture of a lithium salt-graphite composite material and a polymer under conditions sufficient to produce a lithium salt graphite composite cathode that is capable of allowing anionic-redox reaction to occur within a graphite lattice and capable of stabilizing an oxidized product by intercalating the oxidized product into the graphite lattice.

11. The method of claim 10 further comprising the steps of admixing a lithium salt and graphite and milling said mixture to produce said lithium salt-graphite composite material prior to admixing with said polymer.

12. The method of claim 10, wherein said polymer comprises poly(vinylidenedifluoride) (PTFE), 1,1,2,2-tetrafluoroethyl-2,2,2-trifluoroethyl ether, 1,1,2,2-tetrafluoroethyl-2,2,3,3-tetrafluoropropyl ether, bis(2,2,2-trifluoroethyl) ether, or a mixture thereof.

13. A rechargeable lithium-ion battery comprising:
   a composite cathode comprising at least one lithium salt and graphite, wherein said composite cathode is configured such that an oxidation of said lithium salt results in intercalation of an oxidation product of said lithium salt within said graphite;
   an aqueous gel electrolyte; and
   an anode comprising a highly fluorinated ether polymer.

14. The rechargeable lithium-ion battery according to claim 13 having an energy density of at least 400 Wh/kg.

15. The rechargeable lithium-ion battery according to claim 13, wherein a coulombic efficiency of said battery is at least 95%.

16. The rechargeable lithium-ion battery according to claim 13, wherein said lithium-ion battery has potential of at least about 4 V vs. Li/Li$^+$.

17. The rechargeable lithium-ion battery according to claim 13, wherein said aqueous gel electrolyte comprises water-in-bisalt electrolyte (WiBS).

18. The rechargeable lithium-ion battery according to claim 17, wherein said WiBS comprises lithium bis(trifluoromethanesulfonyl)imide (LiTFSI), lithium trifluoromethanesulfonate (LiOTf), lithium bis(fluorosulfonyl)imide (LiFSI), lithium hexafluorophosphate (LiPF$_6$), Lithium tetrafluoroborate (LiBF$_4$), Lithium difluoro(oxalato)borate (LiDFOB), Lithium hexafluoroarsenate (LiAsF$_6$), asymmetric ammonium salt (Me3EtN·TFSI), N-propyl-N-methylpyrrolidinium bis(trifluoromethanesulfonyl)imide (pyr13TFSI), or a mixture thereof.

19. The rechargeable lithium-ion battery according to claim 13, wherein said aqueous gel electrolyte further comprises an organic solvent.

20. The rechargeable lithium-ion battery according to claim 13, wherein at least a portion of said lithium salt is phase-separated from said aqueous gel electrolyte.

* * * * *